United States Patent [19]
Shimizu et al.

[11] Patent Number: 5,596,252
[45] Date of Patent: Jan. 21, 1997

[54] ELECTRICALLY OPERATED POWER STEERING APPARATUS FOR ASSISTING MANUAL STEERING OPERATION IN A MOTOR VEHICLE

[75] Inventors: Yasuo Shimizu; Shinzi Hironaka; Yoshinobu Mukai; Shigieru Yamawaki, all of Saitama, Japan

[73] Assignee: Honda Giken Kogyo Kabushiki Kaisha, Tokyo, Japan

[21] Appl. No.: 353,300

[22] Filed: Dec. 6, 1994

[30] Foreign Application Priority Data

Dec. 6, 1993 [JP] Japan .................... 5-305625
Dec. 6, 1993 [JP] Japan .................... 5-305626
Oct. 24, 1994 [JP] Japan .................... 6-2584479

[51] Int. Cl.⁶ .................................... H02P 7/00
[52] U.S. Cl. ........................... 318/432; 180/446
[58] Field of Search ............... 318/432, 280–286, 318/466–470; 180/79.1, 142, 143, 141, 148

[56] References Cited

U.S. PATENT DOCUMENTS

| | | | |
|---|---|---|---|
| 4,530,414 | 7/1985 | Fukino et al. | 180/142 |
| 4,538,698 | 9/1985 | Hashimoto et al. | 180/79.1 |
| 4,666,011 | 5/1987 | Ohe et al. | 318/282 X |
| 4,730,686 | 3/1988 | Shimizu . | |
| 4,875,541 | 10/1989 | Oshita et al. | 180/79.1 |
| 4,918,744 | 4/1990 | Shimizu | 388/833 |
| 4,951,199 | 8/1990 | Whitehead | 180/142 X |
| 5,040,629 | 8/1991 | Matsuoka et al. | 180/79.1 |
| 5,053,966 | 10/1991 | Takahashi et al. . | |
| 5,072,804 | 12/1991 | Bischof et al. | 180/142 |
| 5,103,926 | 4/1992 | Ohno et al. | 180/142 |
| 5,388,658 | 2/1995 | Ando et al. | 180/142 X |
| 5,482,129 | 1/1996 | Shimizu | 180/79.1 |

FOREIGN PATENT DOCUMENTS

| | | |
|---|---|---|
| 0150589A1 | 8/1985 | European Pat. Off. . |
| 0398238A1 | 11/1990 | European Pat. Off. . |
| 0556870A1 | 8/1993 | European Pat. Off. . |
| 0566168 | 10/1993 | European Pat. Off. . |
| 62-238165 | 10/1987 | Japan . |
| 2175551 | 12/1986 | United Kingdom . |
| 2188891 | 10/1987 | United Kingdom . |
| 2205287 | 12/1988 | United Kingdom . |

*Primary Examiner*—Jonathan Wysocki
*Attorney, Agent, or Firm*—Armstrong, Westerman, Hattori, McLeland & Naughton

[57] ABSTRACT

An electrically operated power steering apparatus basically has a steering torque sensor, a steering rotational speed sensor, and preferably a vehicle sensor. A controller outputs a motor control signal based on a steering torque, a steering rotational speed, and a vehicle speed which are detected by the steering torque sensor, the steering rotational speed sensor, and the vehicle sensor, respectively. The motor control signal is applied to control a motor driver to output a motor drive signal which energizes an electric motor to produce an assistive steering force or a braking force. The electrically operated power steering apparatus is effective to improve steering and returning characteristics of a steering system, and give the steering system a stable steering capability.

10 Claims, 23 Drawing Sheets

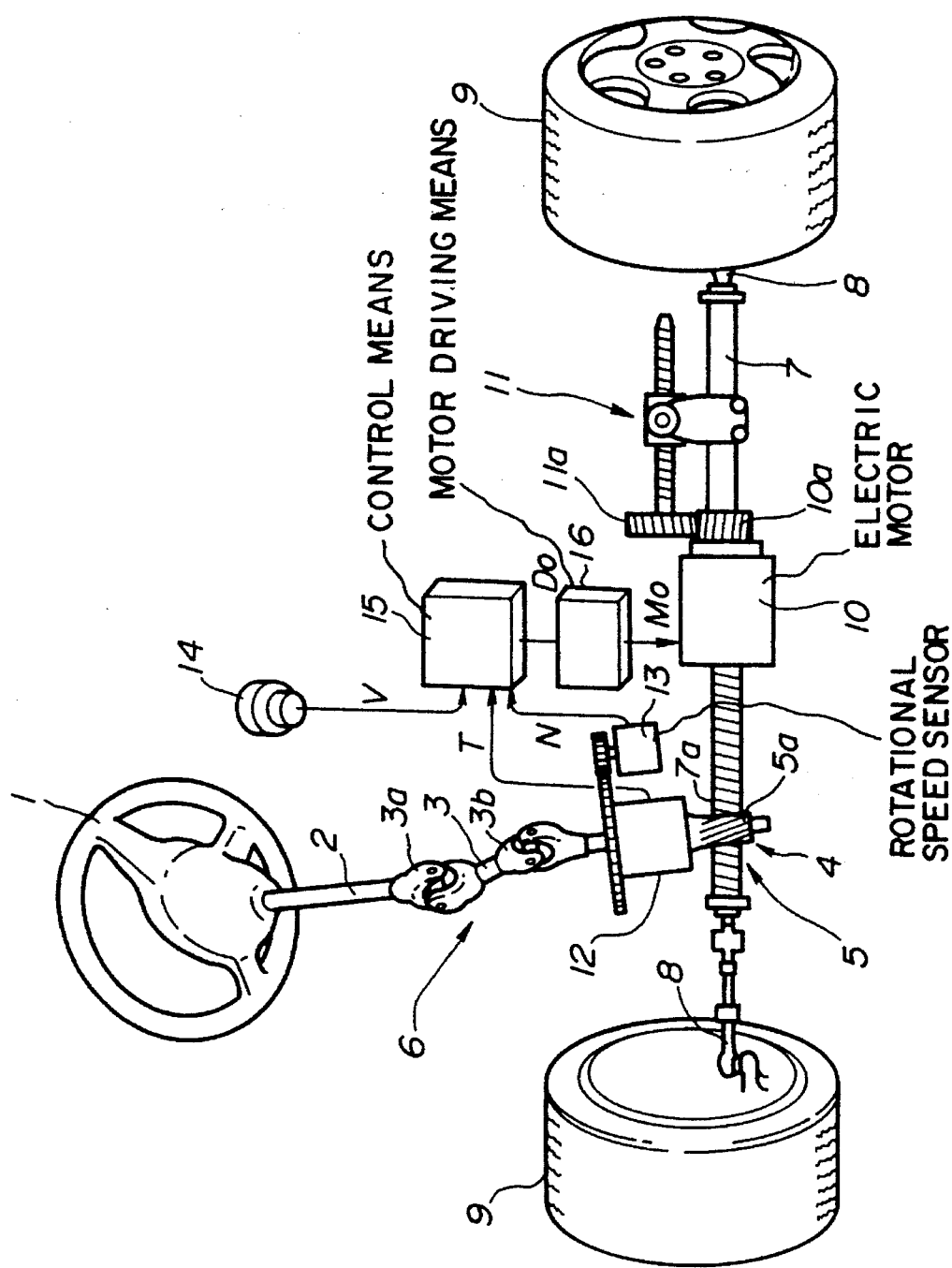

TABLE 1

TABLE 2

TABLE 3

ELECTRICALLY OPERATED POWER STEERING APPARATUS FOR ASSISTING MANUAL STEERING OPERATION IN A MOTOR VEHICLE

BACKGROUND OF THE INVENTION

1. Field of the Invention

The present invention relates to an electrically operated power steering apparatus for applying the power of an electric motor as an assistive steering force to a mechanical steering system to reduce the manual force required to steer a motor vehicle which incorporates such an electrically operated power steering apparatus.

2. Description of the Prior Art

One known electrically operated power steering apparatus, which is disclosed in Japanese laid-open patent publication No. 62-238165, has a steering torque detecting means for detecting the steering torque of a steering system, a steering rotational speed detecting means for detecting the steering rotational speed of the steering system, a returned state detecting means for detecting a returned state of the steering system, a vehicle speed detecting means for detecting the speed of a motor vehicle which incorporates the electrically operated power steering apparatus, and a correcting means for limiting the maximum value of an output signal from the steering rotational speed detecting means to a value which decreases as the vehicle speed based on an output signal from the vehicle speed detecting means increases. A control signal for controlling an electrical motor which generates an assistive steering force is determined on the basis of an output signal from the steering torque detecting means and an output signal from the correcting means.

The conventional electrically operated power steering apparatus operates as follows: The maximum value ($D_{NMAX}$) of a returning rotational speed control signal for the electric motor which decreases as the vehicle speed V increases, and rotational speed control signals ($D_N$) for the electric motor which correspond to steering rotational speeds N are stored as a table in a memory. When a returned state of the steering system is detected by the returned state detecting means, the maximum value ($D_{NMAX}$) of the returning rotational speed control signal is compared with the rotational speed control signal $D_N$. Even when the rotational speed control signal $D_N$ exceeds the maximum value ($D_{NMAX}$) of the returning rotational speed control signal ($D_N > D_{NMAX}$), the rotational speed control signal $D_N$ is reduced to the maximum value ($D_{NMAX}$) of the returning rotational speed control signal. When the motor vehicle runs at a low speed, the returning speed of the steering system is held at a relatively large level to allow the steering system to have an increased returning capability, and then the motor vehicle runs at a high speed, the returning speed of the steering system is lowered to increase steering system returning stability.

Therefore, when the motor vehicle runs at a low speed, the conventional electrically operated power steering apparatus maintains a high returning speed of the electric motor for increased returning performance, and when the motor vehicle runs at a high speed, the conventional electrically operated power steering apparatus reduces the returning speed of the electric motor as the vehicle speed increases, thereby shortening the time required for the steering system to converge to a neutral position, so that the returning stability can be improved.

The conventional electrically operated power steering apparatus utilizes a voltage induced by the electric motor to vary damping characteristics of the steering system for thereby improving steering characteristics of the motor vehicle. When the motor vehicle runs at a higher speed, since the motor vehicle behaves or responds more sharply than when it runs at a lower speed, the steering wheel tends to lose directional control due to road and tire conditions particularly at the time the motor vehicle moves across pavement joints or steps.

When the motor vehicle is steered in the vicinity of the resonant frequency of the yaw rate of the motor vehicle, the yaw rate gain of the motor vehicle is increased, causing the motor vehicle to behave more sharply and making the steering response insufficient as felt by the driver.

Consequently, the steering system is required to be given positive damping characteristics, and to be given greater damping characteristics.

The damping characteristics of the steering system may be improved by a mechanical damper device, such as a steering damper, connected to the steering system. However, inasmuch as the damping characteristics of the steering damper are determined by the viscosity of oil used, if the damping characteristics of the steering damper are established to maintain stability when the motor vehicle runs at a high speed, then the returning capability of the steering system may be lowered when the steering system has a low self-aligning torque such as at the time the motor vehicle runs on a road with a low coefficient of friction or at a low speed or the ambient temperature is low.

The mechanical damper device added to the steering system results in a large system size, making the system difficult to install and highly costly to manufacture.

Furthermore, since the damping characteristics for controlling the electric motor do not take into account any component relative to the steering torque, the steering system requires large manual steering forces as when the motor vehicle is to be turned quickly to avoid an object in emergency, for example.

SUMMARY OF THE INVENTION

It is therefore an object of the present invention to provide an electrically operated power steering apparatus which will increase the damping characteristics of a steering system as a vehicle speed increases, improve the returning characteristics of the steering system when the vehicle speed is low, greatly improve vehicle stability when the vehicle speed is high, and does not make the steering system large in size.

Another object of the present invention is to provide an electrically operated power steering apparatus which will increase the damping characteristics of a steering system as a steering rotational speed increases and reduce the damping characteristics of the steering system as a steering torque increases for thereby allowing a motor vehicle behavior to converge quickly upon changing lanes when the motor vehicle runs at a high speed, and supply optimum assistive steering forces while preventing manual steering forces from increasing as when the motor vehicle is quickly steered to avoid an object in emergency, for example.

According to the present invention, there is provided an electrically operated power steering apparatus for applying power of an electrical motor to a steering system to reduce manual steering forces in a motor vehicle, comprising steering torque detecting means for detecting a steering torque of the steering system, steering rotational speed detecting means for detecting a steering rotational speed of the steering system, motor control signal determining means for determining a motor control signal which is produced by reducing a value corresponding to an output signal from the steering rotational speed detecting means from a value corresponding to an output signal from the steering torque detecting means, and motor driving means for energizing the electric motor based on the motor control signal outputted from the motor control signal determining means.

According to the present invention, there is also provided an electrically operated power steering apparatus for applying power of an electric motor to a steering system to reduce manual steering forces in a motor vehicle, comprising steering torque detecting means for detecting a steering torque of the steering system, steering rotational speed detecting means for detecting a steering rotational speed of the steering system, steering state detecting means for detecting a turned state and a returned state of the steering system, motor control signal determining means for determining a motor control signal which is produced by subtracting a value corresponding to an output signal from the steering rotational speed detecting means from a value corresponding to an output signal from the steering torque detecting means if the steering state detecting means detects the turned state of the steering system, and adding the value corresponding to the output signal from the steering rotational speed detecting means to the value corresponding to the output signal from the steering torque detecting means if the steering state detecting means detects the returned state of the steering system, and motor driving means for energizing the electric motor based on the motor control signal outputted from the motor control signal determining means.

According to the present invention, there is further provided an electrically operated power steering apparatus for applying power of an electric motor to a steering system to reduce manual steering forces in a motor vehicle, comprising steering torque detecting means for detecting a steering torque of the steering system, vehicle speed detecting means for detecting a vehicle speed of the motor vehicle, steering state detecting means for detecting a turned state and a returned state of the steering system, motor control signal determining means for determining a motor control signal which is produced by subtracting a value corresponding to an output signal from the vehicle speed detecting means from a value corresponding to an output signal from the steering torque detecting means if the steering state detecting means detects the turned state of the steering system, and adding the value corresponding to the output signal from the vehicle speed detecting means to the value corresponding to the output signal from the steering torque detecting means if the steering state detecting means detects the returned state of the steering system, and motor driving means for energizing the electric motor based on the motor control signal outputted from the motor control signal determining means.

According to the present invention, there is also provided an electrically operated power steering apparatus for applying power of an electric motor to a steering system to reduce manual steering forces in a motor vehicle, comprising steering torque detecting means for detecting a steering torque of the steering system, steering rotational speed detecting means for detecting a steering rotational speed of the steering system, vehicle speed detecting means for detecting a vehicle speed of the motor vehicle, steering state detecting means for detecting a turned state and a returned state of the steering system, motor control signal determining means for determining a motor control signal which is produced by subtracting a product of a value corresponding to an output signal from the steering rotational speed detecting means and a value corresponding to an output signal from the vehicle speed detecting means from a value corresponding to an output signal from the steering torque detecting means if the steering state detecting means detects the turned state of the steering system, and adding the product of the value corresponding to the output signal from the steering rotational speed detecting means and the value corresponding to the output signal from the vehicle speed detecting means to the value corresponding to the output signal from the steering torque detecting means if the steering state detecting means detects the returned state of the steering system, and motor driving means for energizing the electric motor based on the motor control signal outputted from the motor control signal determining means.

The motor control signal determining means may include correction inhibiting means for inhibiting the product from being subtracted and added if the output signal from the steering rotational speed detecting means is smaller than a predetermined value which decreases as the output signal from the vehicle speed detecting means increases.

The steering rotational speed detecting means may comprise motor status detecting means for detecting a motor voltage and a motor current of the electric motor, and steering rotational speed calculating means for calculating the steering rotational speed of the steering system based on an output signal from the motor status detecting means, whereby the steering rotational speed can be indirectly detected.

According to the present invention, there is provided an electrically operated power standing apparatus for applying power of an electric motor to a steering system to reduce manual steering forces in a motor vehicle, comprising steering torque detecting means for detecting a steering torque of the steering system, steering rotational speed detecting means for detecting a steering rotational speed of the steering system, and control means for determining a motor control signal to energize the electric motor based on the steering torque detected by the steering torque detecting means and the steering rotational speed detected by the steering rotational speed detecting means, the control means comprising means for determining the motor control signal by calculating a corrective value by multiplying a value corresponding to the steering rotational speed by a coefficient which decreases depending on the steering torque, and reducing the corrective value from a value corresponding to the steering torque.

According to the present invention, there is also provided an electrically operated power steering apparatus for applying power of an electric motor to a steering system to reduce manual steering forces in a motor vehicles, comprising steering torque detecting means for detecting a steering torque of the steering system, steering rotational speed detecting means for detecting a steering rotational speed of the steering system, steering state detecting means for detecting a turned state and a returned state of the steering system, and control means for determining a motor control signal to energize the electric motor, using a value detected by the steering state detecting means, based on the steering torque detected by the steering torque detecting means and the steering rotational speed detected by the steering rotational speed detecting means, the control means comprising means for determining the motor control signal by calculating a corrective value by multiplying a value corresponding to the steering rotational speed by a coefficient which decreases depending on the steering torque, subtracting the corrective value from a value corresponding to the steering torque if the steering state detecting means detects the turned state of the steering system, and adding the corrective value to the value corresponding to the steering torque if the steering state detecting means detects the returned state of the steering system.

According to the present invention, there is further provided an electrically operated power steering apparatus for applying power of an electric motor to a steering system to reduce manual steering forces in a motor vehicle, comprising steering torque detecting means for detecting a steering torque of the steering system, steering rotational speed detecting means for detecting a steering rotational speed of the steering system, vehicle speed detecting means for detecting a vehicle speed of the motor vehicle, and control means for determining a motor control signal to energize the electric motor based on the steering torque detected by the steering torque detecting means, the steering rotational speed detected by the steering rotational speed detecting means, and the vehicle speed detected by the vehicle speed detecting means, the control means comprising means for determining the motor control signal by calculating a corrective value by multiplying a value corresponding to the steering rotational speed by a coefficient which decreases depending on the steering torque and a coefficient corresponding to the vehicle speed, and reducing the corrective value from a value corresponding to the steering torque.

According to the present invention, there is provided an electrically operated power steering apparatus for applying power of an electric motor to a steering system to reduce manual steering forces in a motor vehicle, comprising steering torque detecting means for detecting a steering torque of the steering system, steering rotational speed detecting means for detecting a steering rotational speed of the steering system, vehicle speed detecting means for detecting a vehicle speed of the motor vehicle, steering state detecting means for detecting a turned state and a returned state of the steering system, and control means for determining a motor control signal to energize the electric motor, using a value detected by the steering state detecting means, based on the steering torque detected by the steering torque detecting means, the steering rotational speed detected by the steering rotational speed detecting means, and the vehicle speed detected by the vehicle speed detecting means, the control means comprising means for determining the motor control signal by calculating a corrective value by multiplying a value corresponding to the steering rotational speed by a coefficient which decreases depending on the steering torque and a coefficient corresponding to the vehicle speed, subtracting the corrective value from a value corresponding to the steering torque if the steering state detecting means detects the turned state of the steering system, and adding the corrective value to the value corresponding to the steering torque if the steering state detecting means detects the returned state of the steering system.

The control means may have output signal control means, including a sign determining unit, for determining the motor control signal in a direction opposite to the steering torque through the sign determining unit if the motor control signal is determined as being of a negative value.

Alternatively, the control means may have output signal control means, including a correction inhibition control unit, for outputting the motor control signal while inhibiting a correction process through the correction inhibition control unit if the motor control signal is determined as being of a negative value.

Further alternatively, the control means may have output signal control means, including a short-circuiting signal output unit, for outputting the motor control signal to short-circuit terminals of the electric motor through short-circuiting signal output unit if the motor control signal is lower than a predetermined value.

The above and further objects, details and advantages of the present invention will become apparent from the following detailed description of preferred embodiments thereof, when read in conjunction with the accompanying drawings.

BRIEF DESCRIPTION OF THE DRAWINGS

FIG. 1 is a schematic perspective view of the mechanical arrangement of an electrically operated power steering apparatus according to the present invention;

DETAILED DESCRIPTION OF THE PREFERRED EMBODIMENTS

Figure 2A:
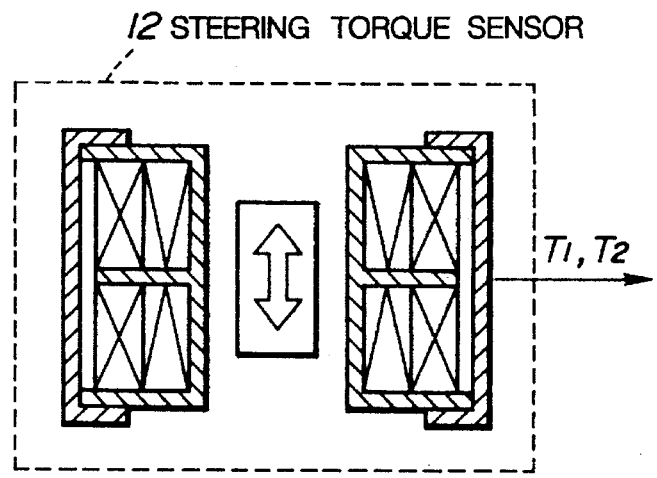
FIGS. 2(a), 2(b), and 2(c) are views of a steering torque sensor, a steering rotational speed sensor, and a vehicle speed sensor which can be employed in the electrically operated power steering apparatus shown in FIG. 1.

As shown in FIG. 1, the mechanical arrangement of an electrically operated power steering apparatus according to the present invention has a manual steering force generated means 6 composed of a steering shaft 2 integral with a steering wheel 1, and a steering gearbox 4 operatively coupled to the steering shaft 2 through a coupling shaft 3 having universal joints 3a, 3b, the steering gearbox 4 having a rack and pinion mechanism 5.

The rack and pinion mechanism 5 has a pinion 5a meshing with rack teeth 7a of a reciprocally movable rack shaft 7 having opposite ends coupled through respective tie rods 8 to steerable front left and right wheels 9.

When the steering wheel 1 is turned (turned state), the rack and pinion mechanism 5 is operated to turn the front wheels 9 to steer a motor vehicle which incorporates the electrically operated power steering apparatus.

In order to reduce manual steering forces produced by the manual steering force generating means 6, an electric motor 10 for generating assistive steering forces is disposed coaxially with the rack shaft 7. An assistive steering force generated by the electric motor 10 is converted by a ball screw mechanism 11 extending parallel to the rack shaft 7 into a thrust force which is applied to the rack shaft 7.

A drive helical gear 10a is integrally joined to a rotor (not shown) of the electric motor 10, and held in mesh with a driven helical gear 11a coupled coaxially to an end of the screw shaft of the ball screw mechanism 11. The ball screw mechanism 11 has a nut connected to the rack shaft 7.

The steering gearbox 4 has a steering torque sensor 12 for detecting a manual torque acting on the pinion 5a. A steering rotational speed sensor 13 is associated with the steering shaft 2 for detecting a steering rotational speed corresponding to the rotational speed of the steering shaft 2. The steering torque sensor 12 and the steering rotational speed sensor 13 supply a torque signal T and a steering rotational speed signal N, respectively, to a control means 15.

A vehicle speed sensor 14 produces a vehicle speed signal V representing the speed of the motor vehicle, and supplies the vehicle speed signal V to the control means 15.

The steering front wheels 9 are mechanically connected to the steering wheel 1. The control means 15 processes either the torque signal T produced by the steering torque sensor 12, the steering rotational speed signal N produced by the steering rotational speed sensor 13, and the vehicle speed signal V produced by the vehicle speed sensor 14, or any combination of the torque signal T, the steering rotational speed signal N, and the vehicle speed signal V, thereby to produce a motor control signal Do, e.g., a PWM (pulse-width-modulation) signal, to enable a motor driving means 16, which may comprise a bridge circuit of FETs, for example, to energize the electric motor 10 in a PWM mode for producing assistive steering forces suitable for turning and returned states of the steering wheel 1 as the motor vehicle runs.

Figure 2B:
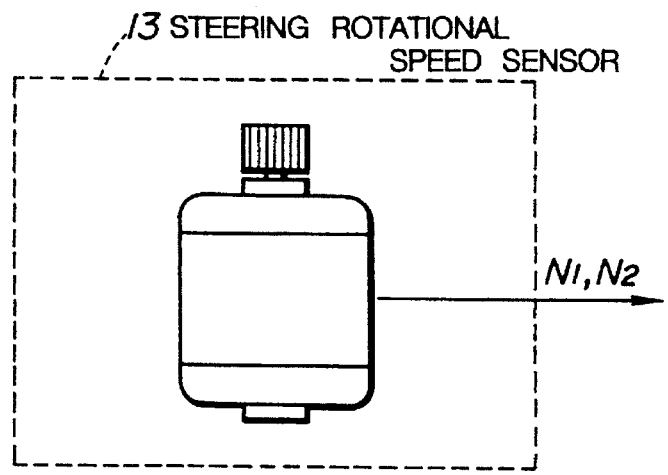
Figure 2C:
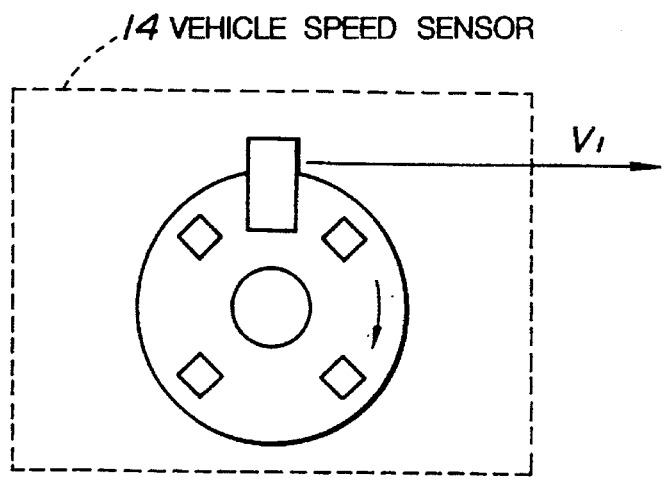

FIGS. 2(a), 2(b), and 2(c) show the steering torque sensor 12, the steering rotational speed sensor 13, and the vehicle speed sensor 14, respectively.

In FIG. 2(a), the steering torque sensor 12 comprises a differential transformer. In FIG. 2(b), the steering rotational speed sensor 13 comprises a DC generator such as a tachometer generator or the like. In FIG. 2(c), the vehicle speed sensor 14 comprises a speedometer composed of a rotating disk having slits and a photocoupler.

Specifically, the steering torque sensor 12 outputs torque signals depending on the direction in which the steering wheel 1 is turned and the steering torque, e.g., a torque signal T1 representing a vector quantity when the steering wheel 1 is turned to the right, and a torque signal T2 representing a vector quantity when the steering wheel 1 is turned to the left. The steering rotational speed sensor 13 outputs signals depending on the direction in and the speed at which the steering wheel 1 is turned e.g., a signal N1 representing a vector quantity when the steering wheel 1 is turned to the right, and a signal N2 representing a vector quantity when the steering wheel 1 is turned to the left. The vehicle speed sensor 14 outputs a signal V1 representing a scalar quantity depending on the vehicle speed.

Figure 3:
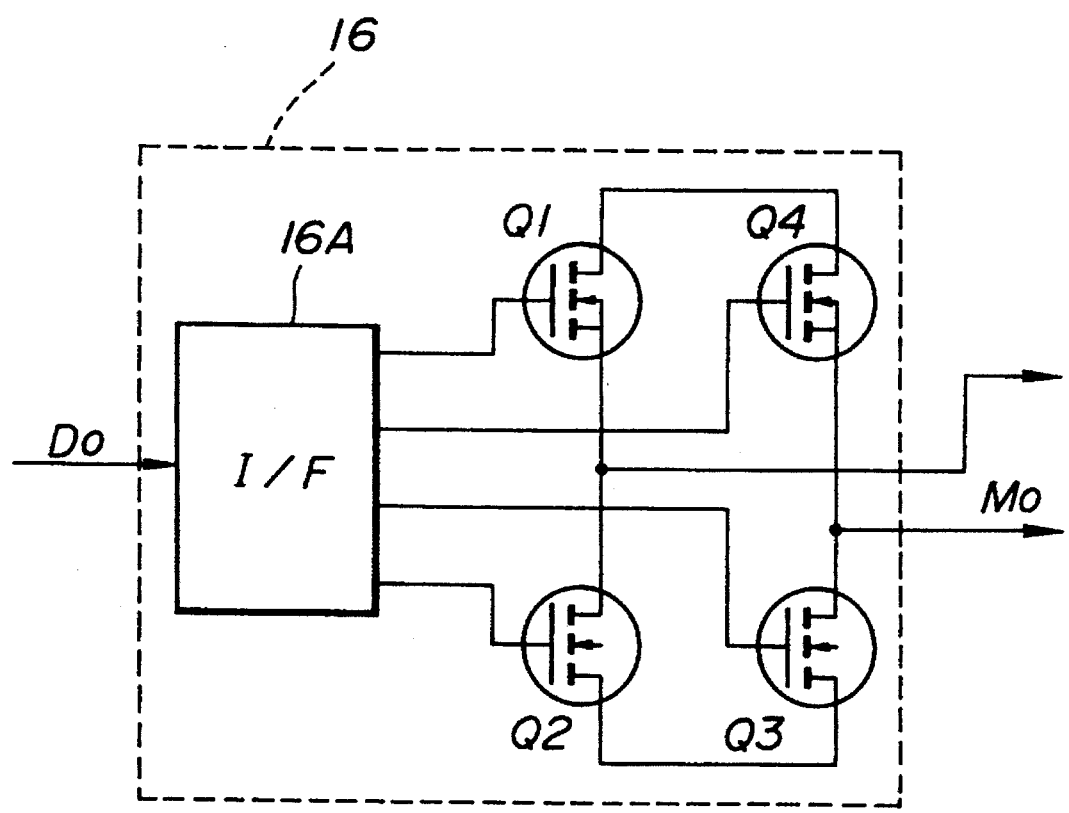
FIG. 3 is a circuit diagram of a motor driving means including a bridge of FETs which can be employed in the electrically operated power steering apparatus shown in FIG. 1.

FIG. 3 shows the motor driving means 16 in detail.

As shown in FIG. 3, the motor driving means 16 comprises an interface 16A and a bridge circuit of four FETs (field-effect transistors) Q1, Q2, Q3, Q4. The motor driving means 16 outputs a motor drive signal Mo for energizing the electric motor 10 based on the motor control signal Do.

The motor control signal Do which is inputted to the interface 16A is produced from a directional signal for controlling the direction in which to rotate the electric motor 10 and a PWM signal for controlling a drive quantity (a drive torque and a rotational speed) for the electric motor 10. If the electric motor 10 is to rotate to the right, the FET Q1 is turned on by the directional signal, and the gate of the FET Q3 is controlled by the duty ratio of the PWM signal. If the electric motor 10 is to rotate to the left, the FET Q4 is turned on by the directional signal, and the gate of the FET Q2 is controlled by the duty ratio of the PWM signal.

The FETs Q1, Q4 or the FETs Q2, Q3 may be turned on simultaneously to establish a short circuit between the input terminals of the electric motor 10 for electromagnetically braking the electric motor 10.

Figure 4:
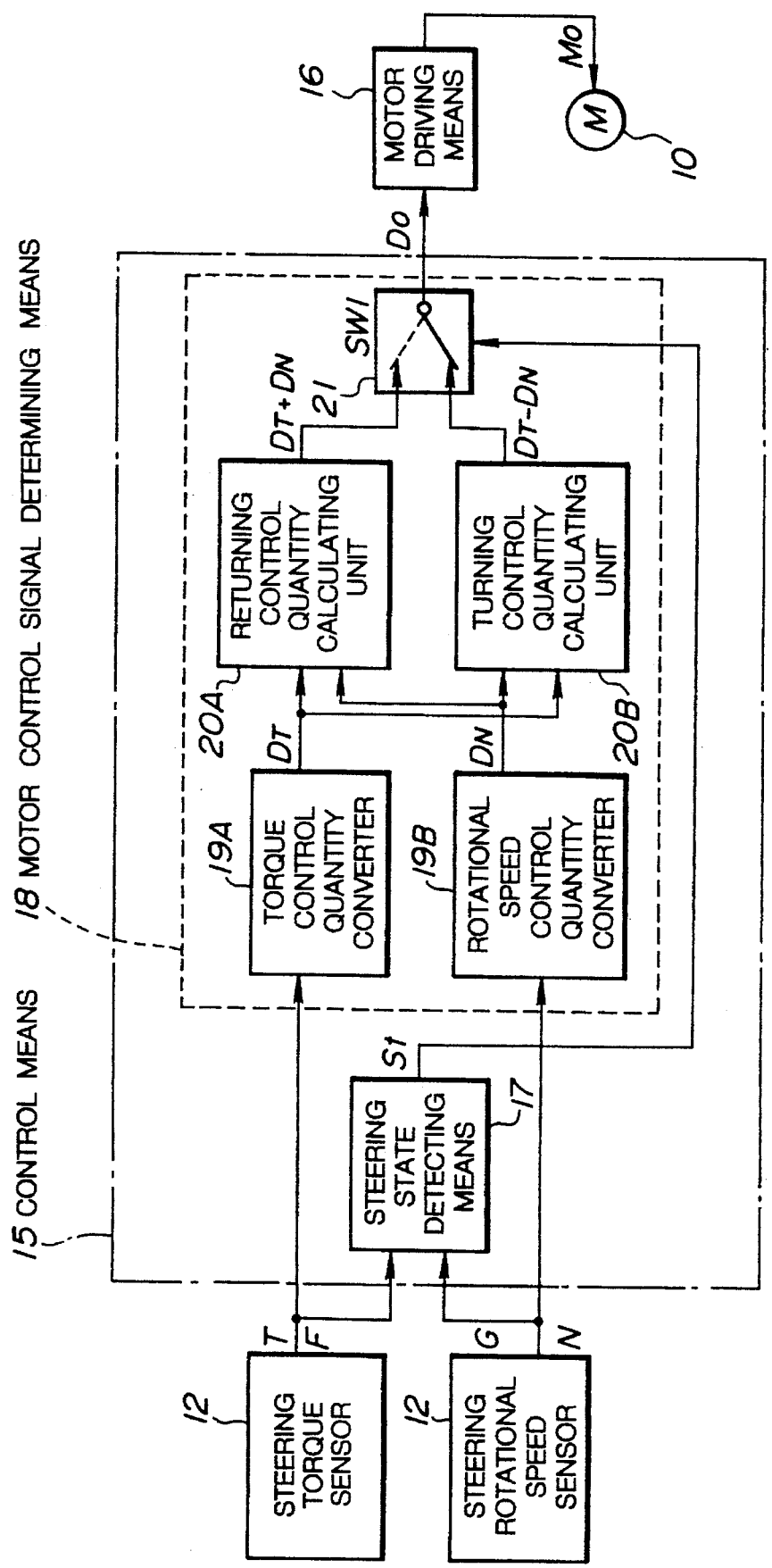
FIG. 4 is a block diagram of the electric arrangement of an electrically operated power steering apparatus according to a first embodiment of the present invention.

FIG. 4 shows in block form the electric arrangement of an electrically operated power steering apparatus according to a first embodiment of the present invention.

The electrically operated power steering apparatus shown in FIG. 4 controls a motor control signal based on a steering torque and a steering rotational speed.

As shown in FIG. 4, the electrically operated power steering apparatus comprises a steering torque sensor 12, a steering rotational speed sensor 13, a control means 15, a motor driving means 16, and an electric motor 10.

The steering torque sensor 12 and the steering rotational speed sensor 13 comprise a differential transformer as shown in FIG. 2(a) and a DC generator such as a tachometer generator or the like as shown in FIG. 2(b), respectively. The motor driving means 16 comprises an FET bridge as shown in FIG. 3.

The control means 15 basically comprises a microprocessor, and has a steering state detecting means 17 and a motor control signal determining means 18. The control means 15 converts the absolute value of the torque signal T detected by the steering torque sensor 12 into a torque control quantity $D_T$ corresponding to the torque signal T and also converts the absolute value of the steering rotational speed signal N detected by the steering rotational speed sensor 13 into a rotational speed control quantity $D_N$ corresponding to the steering rotational speed signal N, determines whether the steering wheel is in the turned or returned state from the torque signal T and the direction indicated by the steering rotational speed signal N, and supplies a motor control signal $(D_T-D_N)$ as the motor control signal Do to the motor driving means 16 when the steering wheel 1 is in the turned state and supplies a motor control signal $(D_T+D_N)$ as the motor control signal Do to the motor driving means 16 when the steering wheel 1 is in the returned state.

The control means 15 has A/D converting means, a direction determining means, etc. (not shown) for converting the absolute values of the torque signal T detected by the steering torque sensor 12 and the steering rotational speed signal N detected by the steering rotational speed sensor 13 into respective digital values, and detecting directions as flags F, G.

The control means 15 also has an output means (not shown) for converting the motor control signals $(D_T-D_N)$, $(D_T+D_N)$ into a motor control signal Do, such for example as a PWM signal, suitable for the motor driving means 16 to control the electric motor 10 therewith, and outputting the motor control signal Do.

The steering state detecting means 17 detects a turned or returned state of the steering wheel 1 based on the directional flag F of the torque signal and the flag G of the steering rotational speed signal N, and supplies a steering state signal St, which is of a high (H) level indicative of the turned state of the steering wheel 1 or a low (L) level indicative of the returned state of the steering wheel 1, to a switch (SW1) 21 of the motor control signal determining means 18.

The turned or returned state is detected based on the signs of the flags F, G. If the signs of the flags F, G agree with each other (F=G), then the steering wheel 1 is determined as being in the turned state. If the signs of the flags F, G do not agree with each other (F≠G), then the steering wheel 1 is determined as being in the returned state.

The motor control signal determining means 18 comprises a torque control quantity converter 19A, a rotational speed control quantity converter 19B, a returning control quantity calculating unit 20A, a turning control quantity calculating unit 20B, and the switch (SW1) 21.

Figure 10:
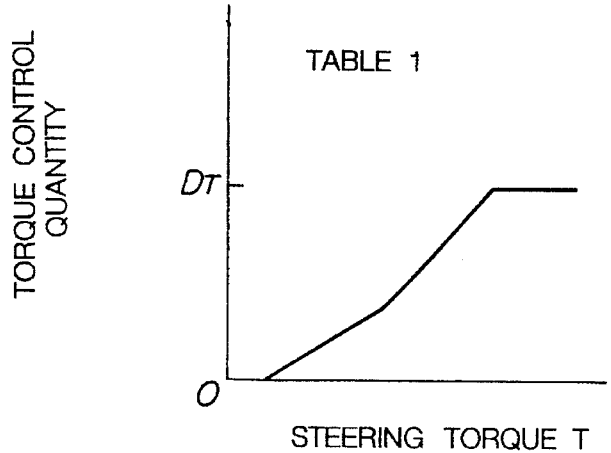
FIG. 10 is a diagram showing vehicle speed V vs. torque control quantity $D\gamma$ characteristics (table 1)

The torque control quantity converter 19A has a memory such as a ROM for storing a table 1 shown in FIG. 10, for example, representing data of the steering torque T and the torque control quantity $D_T$ as a corresponding motor control quantity, which are established based on experimental results or theoretical calculations. The torque control quantity converter 19A selects a torque control quantity $D_T$ corresponding to an inputted torque signal T as converted into a digital value, and outputs the selected torque control quantity $D_T$ as a torque control quantity signal $D_T$.

Figure 13:
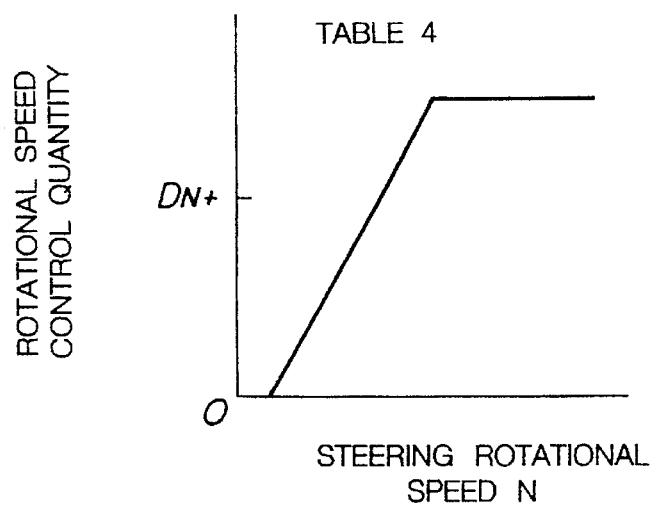
FIG. 13 is a diagram showing steering rotational speed N vs. rotational speed control quantity $D_{N+}$ characteristics (table 4)
Figure 14:
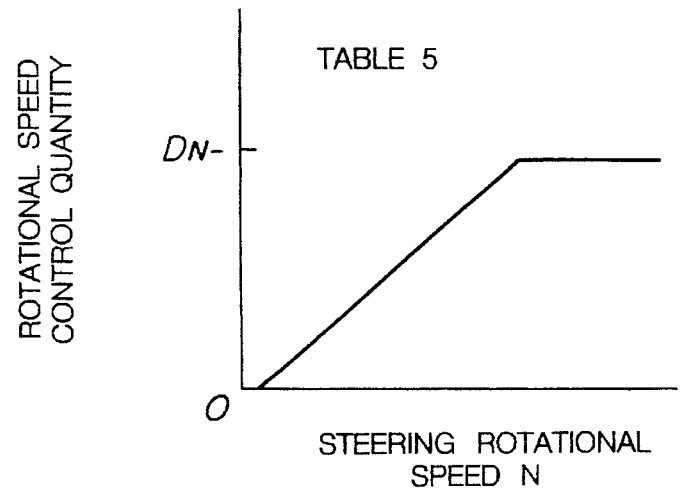
FIG. 14 is a diagram showing steering rotational speed N vs. rotational speed control quantity $D_{N-}$ characteristics (table 5)
Figure 15:
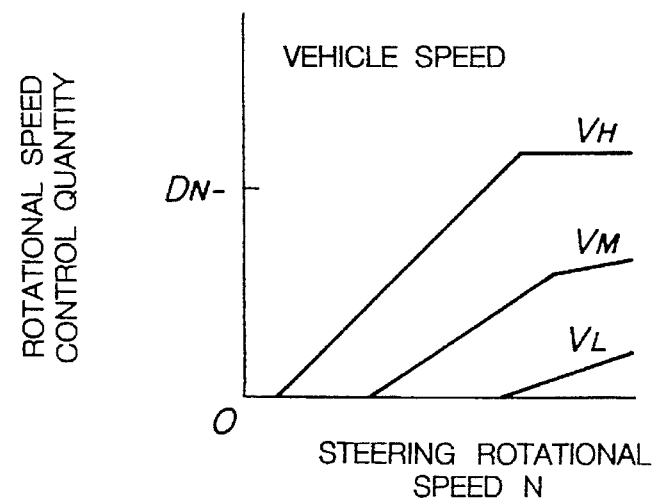
FIG. 15 is a diagram showing steering rotational speed N vs. rotational speed control quantity $D_{N-}$ characteristics.

The rotational speed control quantity converter 19B has a memory such as a ROM for storing a table 4 shown in FIG. 13 or a table 5 shown in FIG. 14, for example, representing data of the steering rotational speed N and the rotational speed control quantity $D_N$ as a corresponding motor control quantity, which are established based on experimental results or theoretical calculations. The rotational speed control quantity converter 19B selects a rotational speed control quantity $D_N$ corresponding to an inputted steering rotational speed N as converted into a digital value, and outputs the selected rotational speed control quantity $D_N$ as a rotational speed control quantity signal $D_N$.

The returning control quantity calculating unit 20A comprises a calculating means such as an adder or the like for adding the torque control quantity signal $D_T$ and the rotational speed control quantity signal $D_N$ to output a motor control signal $(D_T+D_N)$ for the returned state. The turning control quantity calculating unit 20B comprises a calculating means such as a subtractor or the like for calculating the difference between the torque control quantity signal $D_T$ and the rotational speed control quantity signal $D_N$ to output a motor control signal $(D_T-D_N)$ for the turned state.

The switch (SW1) 21 has a program-controlled switch function. If the steering state signal St supplied from the steering state detecting means 17 is of an H level indicating the turned state, the switch (SW1) 21 selects the motor control signal $(D_T-D_N)$ as indicated by the solid line therein. If the steering state signal St supplied from the steering state detecting means 17 is of an L level indicating the returned state, the switch (SW1) 21 selects the motor control signal $(D_T+D_N)$. The switch (SW1) 21 outputs the selected motor control signal as the motor control signal Do.

Therefore, when the steering wheel 1 is in the turned state, the control means 15 effects damping correction by generating the motor control signal Do representative of the difference ($D_T$–$D_N$) between the torque control quantity signal $D_T$ and the rotational speed control quantity signal $D_N$ in the same direction as the direction of steering rotation. When the steering wheel 1 is in the returned state, the control means 15 effects damping correction by generating the motor control signal Do representative of the sum ($D_T$+$D_N$) of the torque control quantity signal $D_T$ and the rotational speed control quantity signal $D_N$ in the opposite direction to the direction of steering rotation. Consequently, when the steering wheel 1 is in the turned state, the electric motor 10 produces an assistive steering force which decreases as the steering rotational speed N increases, and when the steering wheel 1 is in the returned state, the electric motor 10 produces a braking force which increases as the steering rotational speed N increases.

The term "damping correction" signifies that a steering rotational speed component in a direction opposite to the direction of steering rotation (a control quantity corresponding to the rotational speed control quantity) is given to the torque control quantity.

The control means 15 may be arranged such that the rotational speed control quantity $D_N$ from the rotational speed control quantity converter 19B is made available as the rotational speed control quantity $D_{N-}$ in the table 5 shown in FIG. 14 when the steering wheel 1 is in the turned state, and as the rotational speed control quantity $D_{N+}$ in the table 4 shown in FIG. 13 when the steering wheel 1 is in the returned state, and a motor control signal ($D_T$–$D_{N-}$) is outputted when the steering wheel 1 is in the turned state, and a motor control signal ($D_T$+$D_{N+}$) is outputted when the steering wheel 1 is in the returned state.

Briefly summarized, the electrically operated power steering apparatus according to the first embodiment has the steering state detecting means and the motor control signal determining means, and effects subtractive and additive correction processes on a value corresponding to the output signal from the steering torque detecting means and a value corresponding to the output signal from the steering rotational speed detecting means to determine a rotational speed control signal for the electric motor. Therefore, the electric motor can produce an assistive steering force or braking force depending on whether the steering system is in the turned or returned state.

Figure 5:
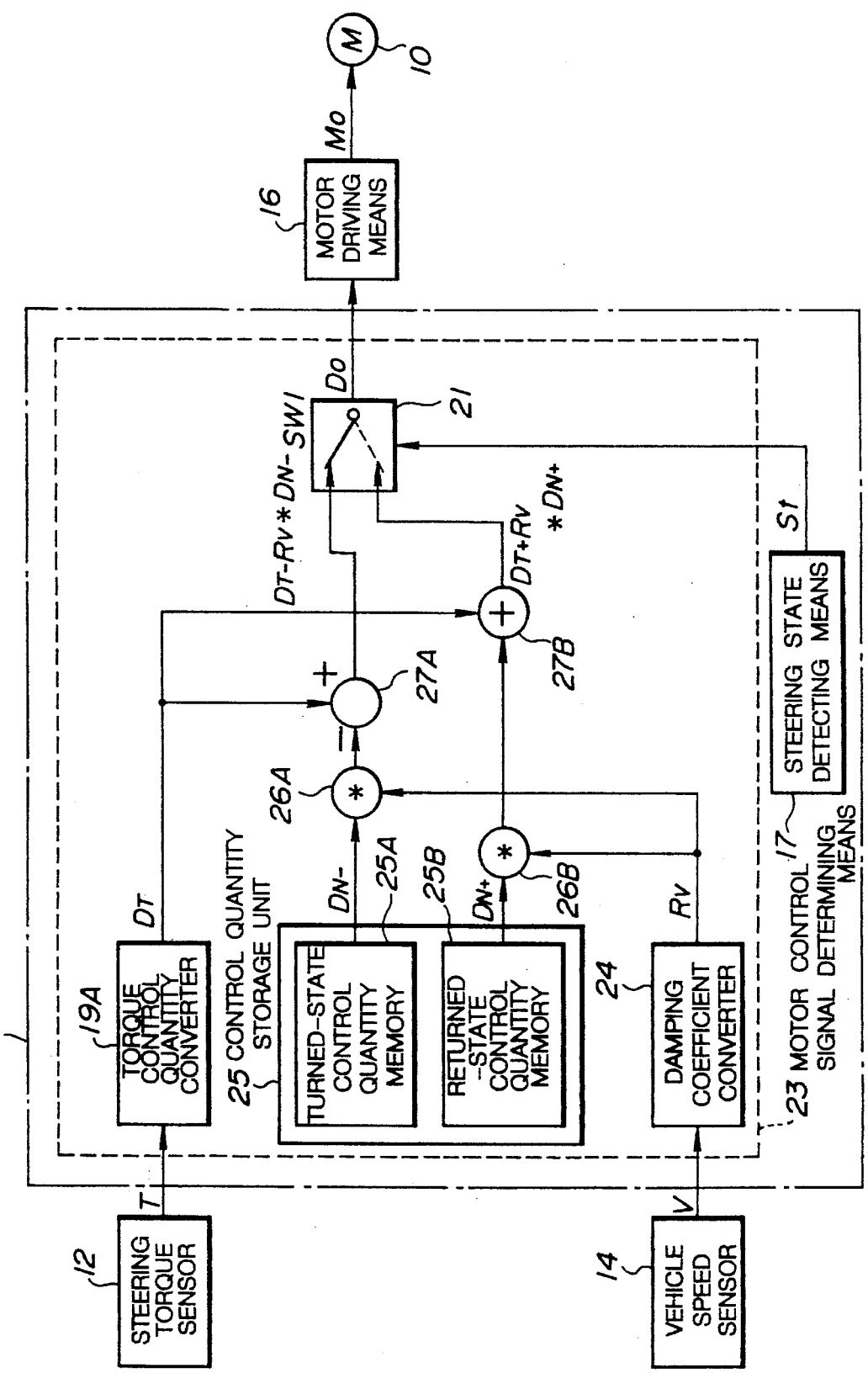
FIG. 5 is a block diagram of the electric arrangement of an electrically operated power steering apparatus according to a second embodiment of the present invention.

FIG. 5 shows in block form the electric arrangement of an electrically operated power steering apparatus according to a second embodiment of the present invention.

The electrically operated power steering apparatus shown in FIG. 5 controls a motor control signal based on a steering torque and a vehicle speed.

As shown in FIG. 5, the electrically operated power steering apparatus comprises a steering torque sensor 12, a vehicle speed sensor 14, a control means 22, a motor driving means 16, and an electric motor 10.

The steering torque sensor 12 and the vehicle speed sensor 14 comprise a differential transformer as shown in FIG. 2(a) and a speedometer composed of a rotating disk having slits and a photocoupler as shown in FIG. 2(c), respectively. The motor driving means 16 comprises an FET bridge as shown in FIG. 3.

The control means 15 basically comprises a microprocessor, and has a steering state detecting means 17 and a motor control signal determining means 23. The control means 15 converts the absolute value of the torque signal T detected by the steering torque sensor 12 into a motor control quantity $D_T$ corresponding to the torque signal T and also converts the absolute value of the vehicle speed signal V detected by the vehicle speed sensors 14 into a damping coefficient Rv corresponding to the vehicle speed signal V, multiplies the damping coefficient Rv by given control quantities in the turned and returned states, e.g., constant control quantities $D_{N-}$, $D_{N+}$ relative to the steering rotational speed N, determines whether the steering wheel 1 is in the turned or returned state, and supplies a motor control signal ($D_T$–Rv*$D_{N-}$) as the motor control signal Do to the motor driving means 16 when the steering wheel 1 is in the turned state and supplies a motor control signal ($D_T$+Rv*$D_{N+}$) as the motor control signal Do to the motor driving means 16 when the steering wheel 1 is in the returned state.

The control means 22 has an A/D converting means (not shown) for converting the absolute values of the torque signal T detected by the steering torque sensor 12 and the vehicle speed signal V detected by the vehicle speed sensor 14 into respective digital values.

The control means 22 also has an output means (not shown) for converting the motor control signals ($D_T$–Rv*$D_{N-}$), ($D_T$+Rv*$D_{N+}$) into a motor control signal Do, such for example as a PWM signal, suitable for the motor driving means 16 to control the electric motor 10 therewith, and outputting the motor control signal Do.

The steering state detecting means 17 supplies a steering state signal St, which is of a high (H) level indicative of the turned state of the steering wheel 1 or a low (L) level indicative of the returned state of the steering wheel 1, to a switch (SW1) 21 of the motor control signal determining means 23.

The motor control signal determining means 23 comprises a torque control quantity converter 19A, a damping coefficient converter 24, a control quantity storage unit 25, a pair of multipliers 26A, 26B, a subtractor 27A, an adder 27B, and the switch (SW1) 21.

The torque control quantity converter 19A is of the same arrangement as that shown in FIG. 4, for selecting a torque control quantity $D_T$ corresponding to an inputted torque signal T as converted into a digital value, and outputting the selected torque control quantity $D_T$ as a torque control quantity signal $D_T$.

Figure 11:
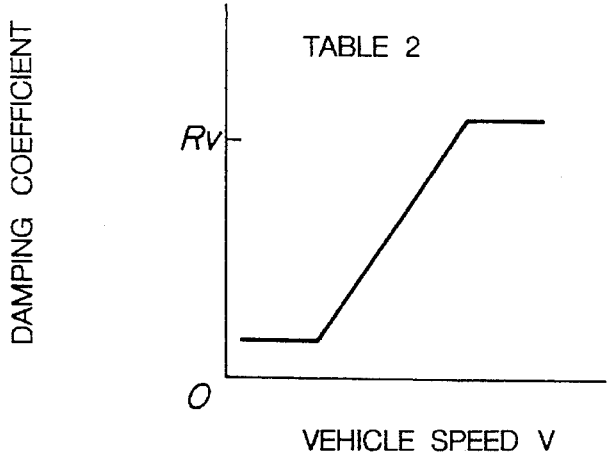
FIG. 11 is a diagram showing vehicle speed V vs. damping coefficient Rv characteristics (table 2)

The damping coefficient converter 24 has a memory such as a ROM for storing a table 2 shown in FIG. 11, for example, representing data of the vehicle speed V and the damping coefficient Rv corresponding thereto, which are established based on experimental results or theoretical calculations. The damping coefficient converter 24 selects a damping coefficient Rv corresponding to an inputted vehicle speed V as converted into a digital value, and outputs the selected damping coefficient Rv.

The control quantity storage unit 25 comprises a memory such as a ROM or the like, and includes a turned-state control quantity memory 25A and a returned-state control quantity memory 25B.

The turned-state control quantity memory 25A and the returned-state control quantity memory 25B store predetermined constant control quantities, e.g., constant control quantities $D_{N1}$, $D_{N+}$ relative to the steering rotational speed N, and select and output the control quantities based on the steering state signal St from the steering state detecting means 17.

The multipliers 26A, 26B multiply the respective control quantities $D_{N1}$, $D_{N+}$ by the damping coefficient Rv, and output their product signals to the subtractor 27A and the adder 27B, respectively.

The subtractor 27A subtracts an output signal (Rv*$D_{N-}$) of the multiplier 26A from the motor control signal $D_T$ corresponding to the torque signal T, and outputs a differential signal to the switch 21. The adder 27B adds an output signal ($Rv*D_{N+}$) of the multiplier 26B to the motor control signal $D_T$ corresponding to the torque signal T, and output a sum signal to the switch 21.

Based on the steering state signal St supplied from the steering state detecting means 17, the switch 21 switches to the subtractor 27A when the steering wheel 1 is in the turned state, and outputs the motor control signal ($D_T-Rv*D_{N-}$) as the motor control signal Do to the motor driving means 16 which energizes the electric motor 10, and switches to the adder 27B when the steering wheel 1 is in the returned state, and outputs the motor control signal ($D_T+Rv*D_{N+}$) as the motor control signal Do to the motor driving means 16 which energizes the electric motor 10.

Therefore, when the steering wheel 1 is in the turned state, the control means 22 generates the motor control signal Do representing the difference ($D_T-Rv*D_{N-}$) between the torque control quantity $D_T$ and the product ($Rv*D_{N-}$) of the damping coefficient Rv and the control quantity $D_{N-}$, in the same direction as the direction of steering rotation, and when the steering wheel 1 is in the returned state, the control means 22 generates the motor control signal Do representing the sum ($D_T+Rv*D_{N+}$) of the torque control quantity $D_T$ and the product ($Rv*D_{N+}$) of the damping coefficient Rv and the control quantity $D_{N30}$, in the opposite direction to the direction of steering rotation. Consequently, when the steering wheel is in the turned state, the electric motor 10 produces an assistive steering force which decreases as the vehicle speed V increases, and when the steering wheel 1 is in the returned state, the electric motor 10 produces a braking force which increases as the vehicle speed V increases.

Figure 6:
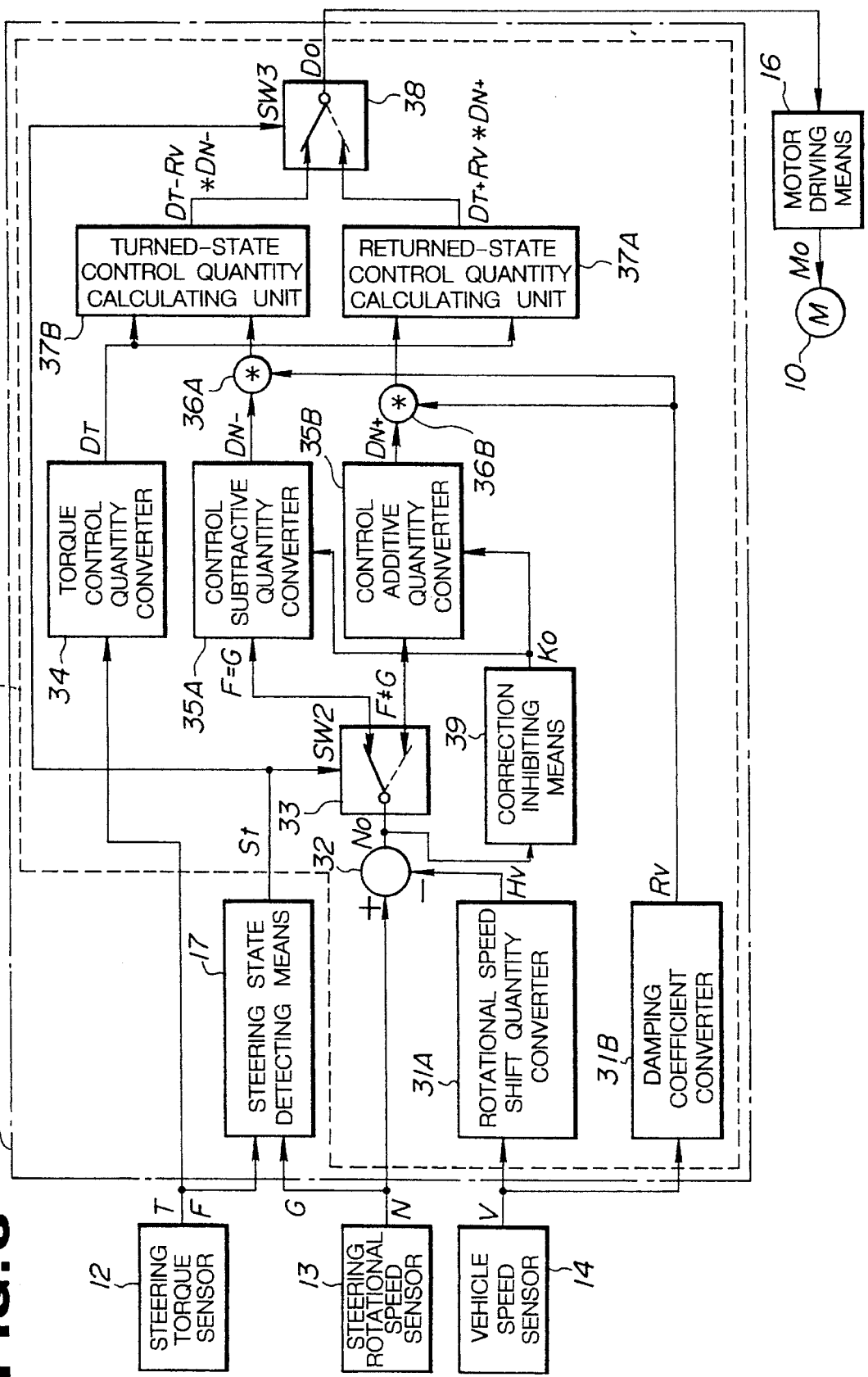
FIG. 6 is a block diagram of the electric arrangement of an electrically operated power steering apparatus according to a third embodiment of the present invention.

FIG. 6 shows in block form the electric arrangement of an electrically operated power steering apparatus according to a third embodiment of the present invention.

The electrically operated power steering apparatus shown in FIG. 6 controls a motor control signal based on a steering rotational speed and a vehicle speed.

As shown in FIG. 6, the electrically operated power steering apparatus comprises a steering torque sensor 12, a steering rotational speed sensor 13, a vehicle speed sensor 14, a control means 29, a motor driving means 16, and an electric motor 10. The steering torque sensor 12, the steering rotational speed sensor 13, the vehicle speed sensor 14, the motor driving means 16, and the electric motor 10 are identical to those described above with reference to FIGS. 4 and 5, and hence will not be described in detail below.

The control means 29 basically comprises a microprocessor, and has a steering state detecting means 17 and a motor control signal determining means 30.

The steering state detecting means 17 is of the same arrangement as that shown in FIG. 4. The steering state detecting means 17 detects whether the steering wheel 1 is in the turned or returned state based on the signal of the flag F of the steering torque T and the sign of the flag G of the steering rotational speed N, and outputs a steering state signal St representative of the detected steering state.

the motor control signal determining means 30 comprises a rotational speed shift quantity converter 31A, a damping coefficient converter 31B, a subtractor 32, a switch (SW2) 33, a torque control quantity converter 34, a control subtractive quantity converter 35A, a control additive quantity converter 35B, a pair of multipliers 36A, 36B, a returned-state control quantity calculating unit 37A, a turned-state control quantity calculating unit 37B, and an ORing switch (SW3) 38.

Figure 12:
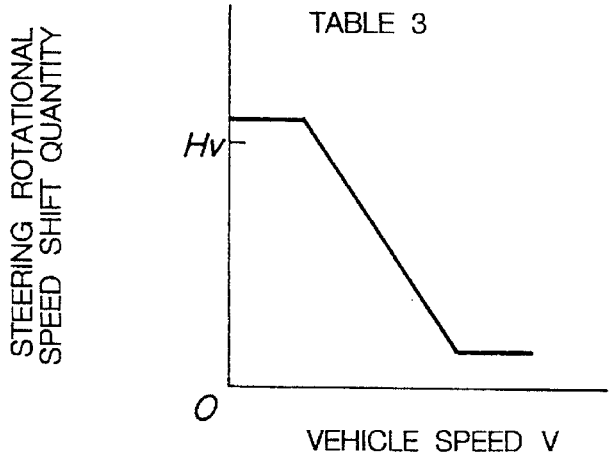
FIG. 12 is a diagram showing vehicle speed V vs. steering rotational speed shift quantity Hv characteristics (table 3)

The rotational speed shift quantity converter 31A and the damping coefficient converter 31B have respective memories such as ROMs for storing, respectively, a table 3 shown in FIG. 12, for example, representing data of the vehicle speed V and a steering rotational speed shift quantity Hv corresponding thereto, and a table 2 shown in FIG. 11, for example, representing data of the vehicle speed V and the damping coefficient Rv corresponding thereto, which are established based on experimental results or theoretical calculations. The rotational speed shift quantity converter 31A and the damping coefficient converter 31B select a steering rotational speed shift quantity Hv and a damping coefficient Rv each corresponding to an inputted vehicle speed V as converted into a digital value, and output the selected steering rotational speed shift quantity Hv and the selected damping coefficient Rv, respectively.

The multipliers 26A, 26B multiply the respective control quantities $D_{N1}$, $D_{N+}$ by the damping coefficient Rv, and output their product signals to the subtractor 27A and the adder 27B, respectively.

The subtractor 32 calculates the difference No ($=N-Hv$) between the steering rotational speed signal N as converted into a digital value and the steering rotational speed shift quantity signal Hv from the rotational speed shift quantity converter 31A, and supplies a differential signal No to the switch (SW2) 33 and a correction inhibiting means 39.

The switch (SW2) 33 has a program-controlled switch function and is operable based on the steering state signal St. If the steering state signal St is of an H level indicating the turned state (F=G), the switch (SW2) 33 supplies the differential signal No to the control subtractive quantity converter 35A, and if the steering state signal St is of an L level indicating the returned state (F≠G), the switch (SW2) 33 supplies the differential signal No to the control additive quantity converter 35B.

The control subtractive quantity converter 35A and the control additive quantity converter 35B have respective memories such as ROMs for storing, respectively, a table 5 shown in FIG. 14, for example, representing data of the steering rotational speed N (No) and the rotational speed control quantity $D_{N-}$ corresponding thereto, and a table 4 shown in FIG. 13, for example, representing data of the steering rotational speed N (No) and the rotational speed control quantity $D_{N+}$ corresponding thereto, which are established based on experimental results or theoretical calculations. The control subtractive quantity converter 35A and the control additive quantity converter 35B select a rotational speed control quantity $D_{N-}$ and a rotational speed control quantity $D_{N+}$, respectively, corresponding to the steering rotational speed No, and output a rotational speed control quantity signal $D_{N-}$ and a rotational speed control quantity signal $D_{N+}$, respectively, to the respective multipliers 36A, 36B.

The multipliers 36A, 36B multiply the respective rotational speed control quantity signal $D_{N-}$, $D_{N+}$ by the damping coefficient Rv, and output their product signals ($Rv*D_{N-}$), ($Rv*D_{N+}$) to the turned-state control quantity calculating unit 37B and the returned-state control quantity calculating unit 37A, respectively.

Based on the torque control quantity signal $D_T$ supplied from the torque control quantity converter 34, which is identical to the torque control quantity converter 19A shown in FIG. 4, and the signals ($Rv*D_{N-}$), ($Rv*D_{N+}$), the returned-state control quantity calculating unit 37A and the turned-state control quantity calculating unit 37B calculate a motor control signal ($D_T+Rv*D_{N+}$) for the turned state a motor control signal $(D_T-Rv*D_{N-})$ for the returned state, respectively. The ORing switch (SW3) 33 selects one of the motor control signal $D_T+Rv*D_{N+}$ and the motor control signal $(D_T-Rv*D_{N-})$ depending on whether the steering system is in the turned or returned state, and outputs the selected motor control signal as the motor control signal Do.

The correction inhibiting means 39 has a determining means such as a comparator or the like. If the differential signal No (=N–Hv) from the subtractor 32 is smaller than a reference value Ks (e.g., 0), the correction inhibiting means 39 supplies an inhibit signal Ko to the returned-state control quantity calculating unit 37A and the turned-state control quantity calculating unit 37B for setting the steering rotational speed signal No, which is the differential signal inputted from the subtractor 32 to the returned-state control quantity calculating unit 37A and the turned-state control quantity calculating unit 37B, to 0.

When the steering rotational speed signal No is set to 0, the motor control signal Do becomes the torque control quantity signal $D_T$ only in both the tuned and returned states of the steering wheel 1, and the motor control signal determining means 30 inhibits the corrective process.

Therefore, the motor control signal determining means 30 reduces the steering rotational speed N to No (=N–Hv) depending on the vehicle speed V. When the steering wheel 1 is in the turned state, the motor control signal determining means 30 subtracts the product $(Rv*D_{N-})$ of the rotational speed control quantity $D_{N-}$ corresponding to the steering rotational speed No and the damping coefficient Rv from the torque control quantity $D_T$ $(D_T-Rv*D_{N-})$ to produce a motor control signal Do in the same direction as the direction of steering rotation, and when the steering wheel 1 is in the returned state, the motor control signal determining means 30 adds the product $(Rv*D_{N+})$ of the rotational speed control quantity $D_{N+}$ corresponding to the steering rotational speed No and the damping coefficient Rv to the torque control quantity $D_T$ $(D_T+Rv*D_{N-})$ to produce a motor control signal Do in the opposite direction to the direction of steering rotation. Consequently, when the steering wheel 1 is in the turned state, the electric motor 10 produces an assistive steering force which decreases as the vehicle speed V and the steering rotational speed N increase, and when the steering wheel 1 is in the returned state, the electric motor 10 produces a braking force which increases as the vehicle speed V and the steering rotational speed N increase.

Figure 7:
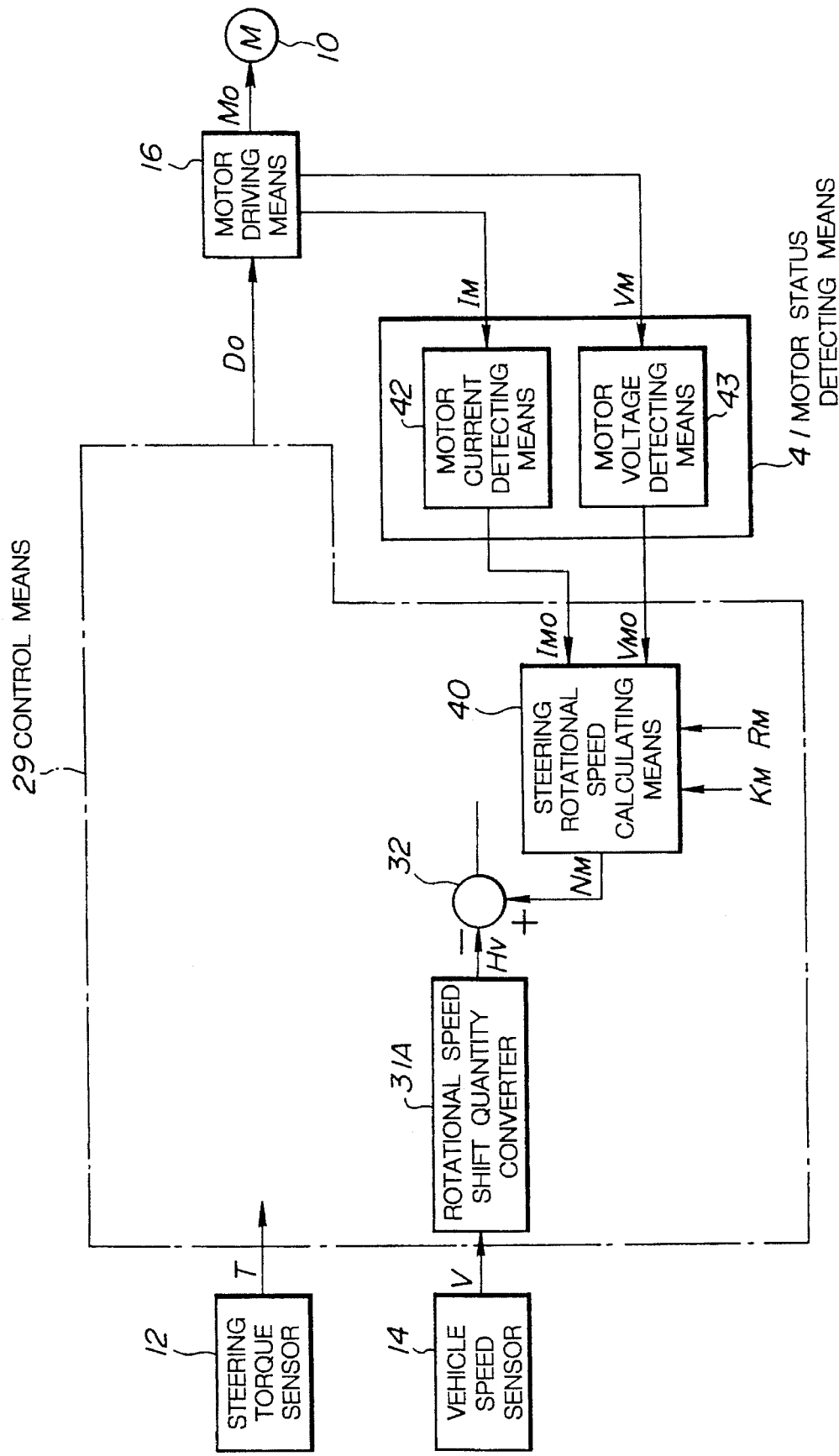
FIG. 7 is a block diagram of the electric arrangement of an electrically operated power steering apparatus according to a fourth embodiment of the present invention.

FIG. 7 shows in block form the electric arrangement of an electrically operated power steering apparatus according to a fourth embodiment of the present invention.

The electrically operated power steering apparatus shown in FIG. 7 differs from the electrically operated power steering apparatus shown in FIG. 6 in that the steering rotational speed sensor 13 is dispensed with, and the electrically operated power steering apparatus includes a motor status detecting means 41 composed of a motor current detecting means 42 for detecting a motor current $I_M$ of the electric motor 10 and a motor voltage detecting means 43 for detecting a motor voltage $V_M$ of the electric motor 10, and the control means 29 includes a steering rotational speed calculating means 40 for calculating a steering rotational speed $N_M$, so that the steering rotation speed N can be calculated rather than being directly detected.

If the impedance $Z_L$ corresponding to the inductance L of the electric motor 10 is ignored (since $Z_L=2\pi f*L$, $Z_L=0$ as the electric motor 10 is a DC motor and F=0), then the steering rotational speed $N_M$ of the electric motor 10 is approximately expressed by the following equation (1):

$$N_M=(V_M-R_M*I_M)/K_M \quad (1)$$

where $I_M$ is the motor current, $V_M$ is the motor voltage, $K_M$ is the induced voltage coefficient of the electric motor, and $R_M$ is the internal resistance of the electric motor.

The motor current detecting means 42 and the motor voltage detecting means 43 detect, respectively, the motor current $I_M$ which actually flows from the motor driving means 16 to the electric motor 10 and the motor voltage $V_M$ developed across the electric motor 10, and the detected motor current $I_M$ and motor voltage $V_M$ are converted by A/D converting means (not shown) in the control means 29 into digital motor current $I_{MO}$ and motor voltage $V_{MO}$, which are supplied to the steering rotational speed calculating means 40.

The steering rotational speed calculating means 40 reads the induced voltage coefficient $K_M$ of the electric motor 10 and the internal resistance $R_M$ of the electric motor 10 from a memory such as a ROM or the like, calculates the steering rotational speed $N_M$ according to the equation (1) given above, and supplies the calculated steering rotational speed $N_M$ to the subtractor 32.

As described above, the motor current $I_M$ and the motor voltage $V_M$ which actually are supplied to and generated across the electric motor 10 are detected by the motor status detecting means 41 and fed back to the steering rotational speed calculating means 40, which then calculates and outputs the steering rotational speed $N_M$ to the subtractor 32, so that the electrically operated power steering apparatus can operate in the same manner as that shown in FIG. 6 based on the steering rotational speed $N_M$.

Figure 8:
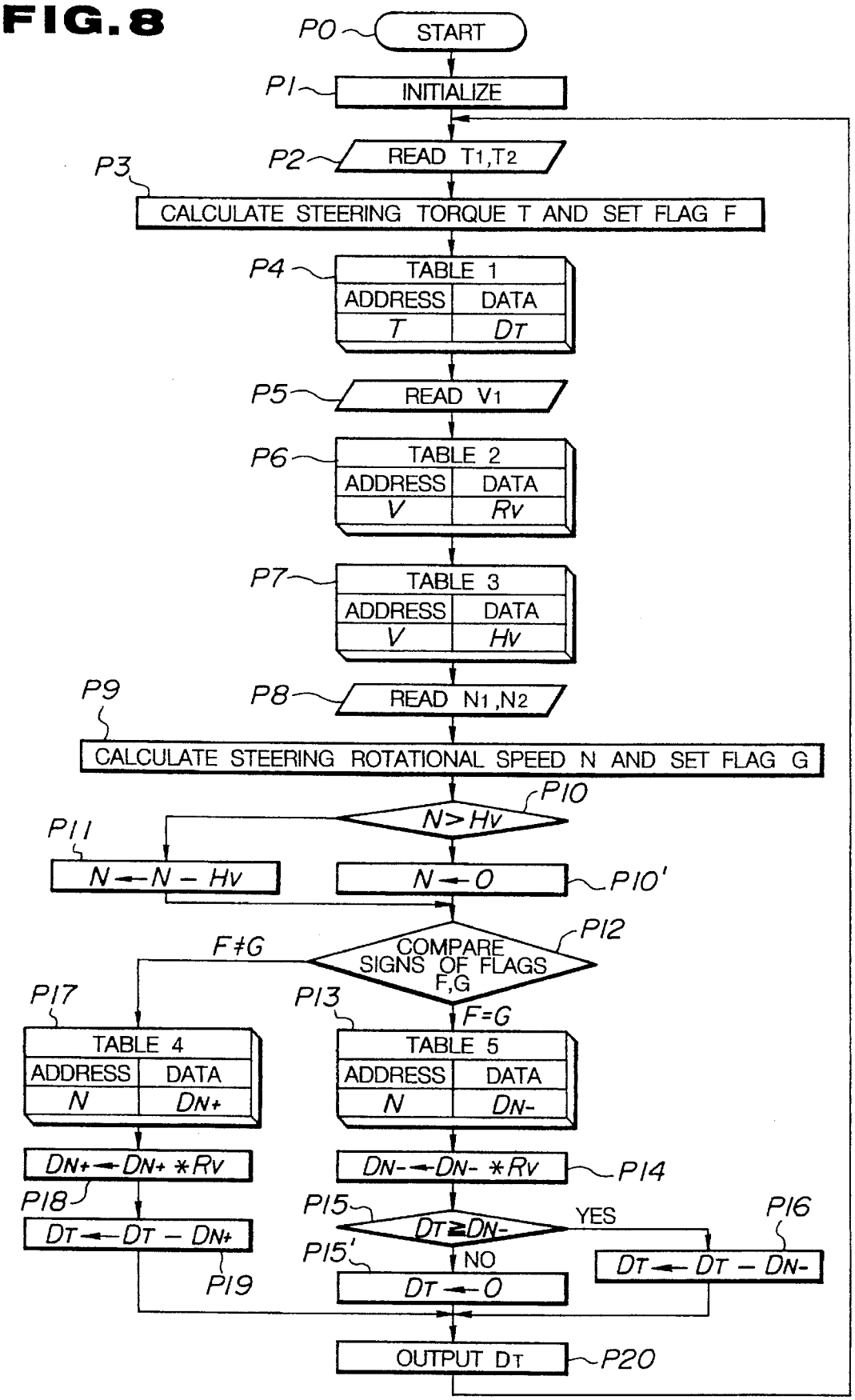
FIG. 8 is a flowchart of a first operation sequence of a control means in the electrically operated power steering apparatus shown in FIG. 6.

A first operation sequence of the electrically operated power steering apparatus shown in FIG. 6 will be described below with reference to FIG. 8. The first operation sequence is composed of successive steps P0 through P20 which are carried out by the control means 29, typically comprising a microprocessor.

When the ignition key switch (not shown) of the electric vehicle is turned on, the control means 29 is energized and starts operating in the step P0.

First, the microprocessor of the control means 29 starts carrying out its control process. The microprocessor sends a control signal such as a power-on reset signal or the like to various parts of the control means 29 to reset or initialize the same in the step P1.

When the steering wheel 1 is operated, steering torque signals T1, T2 representing an analog steering torque and a direction of steering rotation detected by the steering torque sensor 12 are read in the step P2. The read steering torque signals T1, T2 are converted by an A/D converter into a digital torque signal T and a flag F indicative of the direction of the steering torque in the step P3.

The digital torque signal T is then converted into a torque control quantity $D_T$ based on the data of the table 1 (see FIG. 10) stored in the memory of the torque control quantity converter 34, and the torque control quantity $D_T$ is outputted in the step P4.

Then, an analog vehicle speed signal V1 detected by the vehicle speed sensor 14 is converted by an A/D converter into a digital vehicle speed signal V in the step P5. Thereafter, the digital vehicle speed signal V is converted into a corresponding damping coefficient Rv based on the data of the table 2 (see FIG. 11) stored in the memory of the damping coefficient converter 31B, and the damping coefficient Rv is outputted in the step P6. The digital vehicle speed signal V is also converted into a corresponding steering rotational speed shift quantity Hv based on the data of the table 3 (see FIG. 12) stored in the memory of the rotational speed shift quantity converter 31A, and the steering rotational speed shift quantity Hv is outputted in the step P7.

Steering rotational speed signals N1, N2 representing an analog steering rotational speed and a direction of steering rotation detected by the steering rotational speed sensor 13 are read in the step P8. The read steering rotational speed signals N1, N2 are converted by an A/D converter into a digital steering rotational speed signal N and a flag G indicative of the direction of steering rotation in the step P9.

Then, the difference No (=N−Hv) between the steering rotational speed signal N and the steering rotational speed shift quantity Hv is calculated by the subtractor 32, and the resultant steering rotational speed signal N (=No) is outputted. The correction inhibiting means 39 determines whether the difference No exceeds 0 (No>0) or not (No≦0) in the step P10. If No>0, then a steering rotational speed signal N (=No)=N−Hv is outputted in the step P11. If No≦0, then a steering rotational speed signal N (=No)=0 is outputted in the step P10'.

Thereafter, the sign of the flag F indicative of the direction of the steering torque converted in the step P3 and the sign of the flag G indicative of the direction of the steering rotation are compared with each other by the steering state detecting means 17 in the step P12.

If the signs agree with each other (F=G), then the steering state detecting means 17 determines that the steering wheel 1 is in the turned state and controls the switch 33 to supply rotational speed signal N (=No) from the subtractor 32 to the control subtractive quantity converter 35A. The steering rotational speed signal N (=No) is converted into a rotational speed control quantity $D_{N-}$ based on the data of the table 5 (see FIG. 14) stored in the memory of the control subtractive quantity converter 35A in the step P13. The multiplier 36A multiplies the rotational speed control quantity $D_{N-}$ by the damping coefficient Rv, thus producing a product signal ($D_{N-}$*Rv) in the step P14.

The rotational speed control quantity $D_{N-}$ is updated by the product signal ($D_{N-}$*Rv), and compared in level with the torque control quantity $D_T$ converted in the step P4 by the turned-state control quantity calculating unit 37B in the step P15. If the torque control quantity $D_T$ is smaller than the rotational speed control quantity $D_{N-}$ (=$D_{N-}$*Rv), i.e., ($D_T$<$D_{N-}$), then the torque control quantity $D_T$ is set to 0 in the step P15', and a motor control signal $D_T$ (=Do) is outputted in the step P20.

If the torque control quantity $D_T$ is equal to or larger than the rotational speed control quantity $D_{N-}$ (=$N_{N-}$*Rv), i.e., ($D_T$≧$D_{N-}$), then the torque control quantity $D_T$ is set to ($D_T$−$D_{N-}$*Rv) in the step P16, and a motor control signal $D_T$ (=Do) is outputted in the step P20.

If the signs do not agree with each other (F≠G), then the steering state detecting means 17 determines that the steering wheel 1 is in the returned state and controls the switch 33 to supply the steering rotational speed signal N (=No) from the subtractor 32 to the control additive quantity converter 35B. The steering rotational speed signal N (=No) is converted into a rotational speed control quantity $D_{N+}$ based on the data of the table 4 (see FIG. 13) stored in the memory of the control additive quantity converter 35B in the step P17. The multiplier 36B multiplies the rotational speed control quantity $D_{N+}$ by the damping coefficient Rv, thus producing a product signal ($D_{N+}$*Rv) in the step P18.

The rotational speed control quantity $D_{N+}$ is updated by the product signal ($D_{N+}$*Rv), and added to the torque control quantity $D_T$ converted in the step P4 by the returned-state control quantity calculating unit 37A in the step P19. A resultant sum signal ($D_T$+$D_{N+}$*Rv) is outputted as a motor control signal $D_T$ (=Do) is outputted in the step P20.

Figure 9:
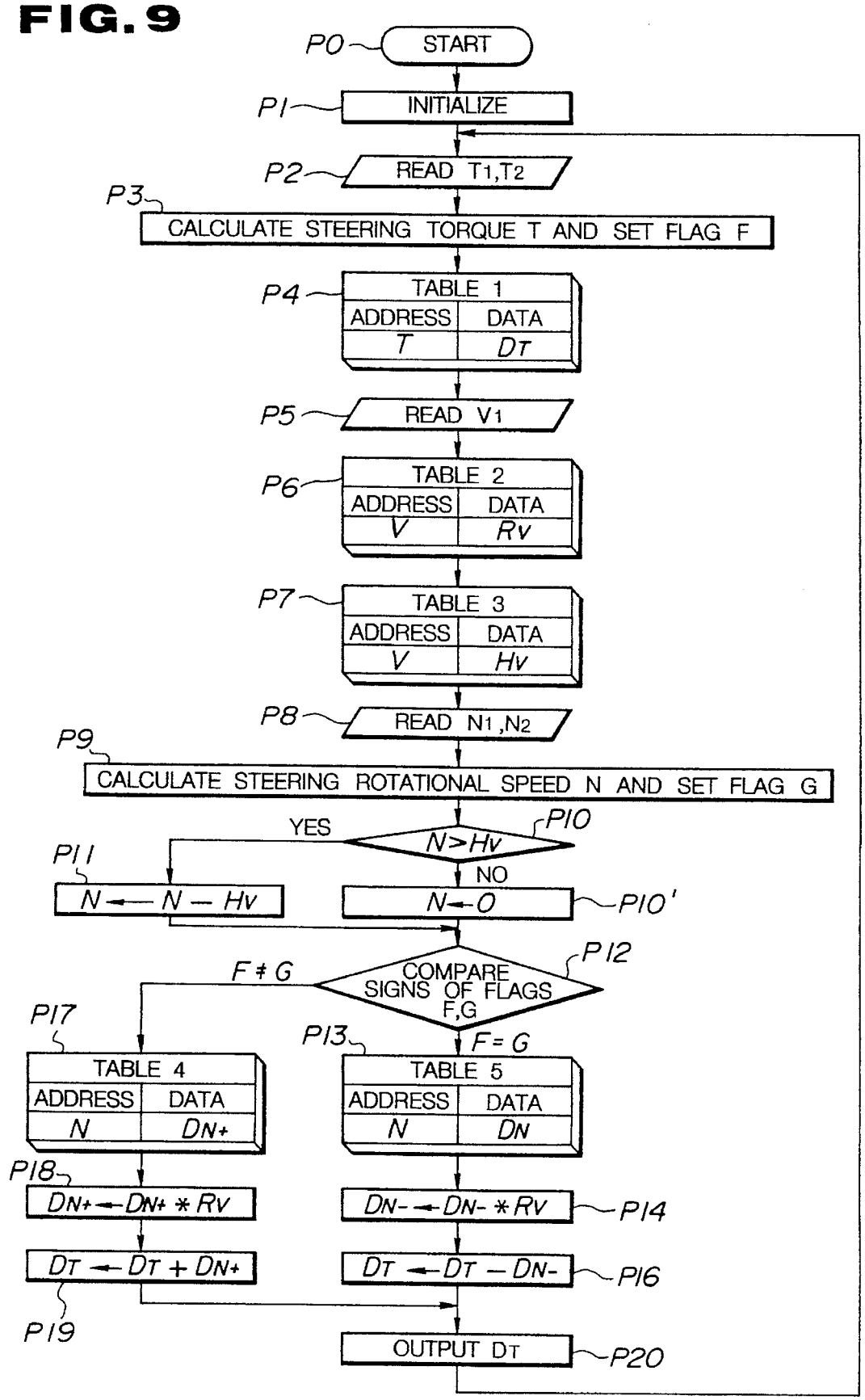
FIG. 9 is a flowchart of a second operation sequence of a control means in the electrically operated power steering apparatus shown in FIG. 6.

FIG. 9 shows a second operation sequence of the electrically operated power steering apparatus shown in FIG. 6. The second operation sequence shown in FIG. 9 differs from the first operation sequence shown in FIG. 8 in that the steps P15, P15' shown in FIG. 8 are dispensed with.

If the torque control quantity $D_T$ is equal to or smaller than the rotational speed control quantity $D_{N-}$ (=$D_{N-}$*Rv), i.e., ($D_T$≦$D_{N-}$), then the sign of the flag F indicative of the direction of the steering torque is varied, a motor control signal $D_T$ (=Do) is outputted to energize different FETs of the motor driving means 16 for thereby changing the direction of rotation of the electric motor 10, and a braking torque corresponding to the motor control signal $D_T$ is applied in an opposite direction.

Figure 16:
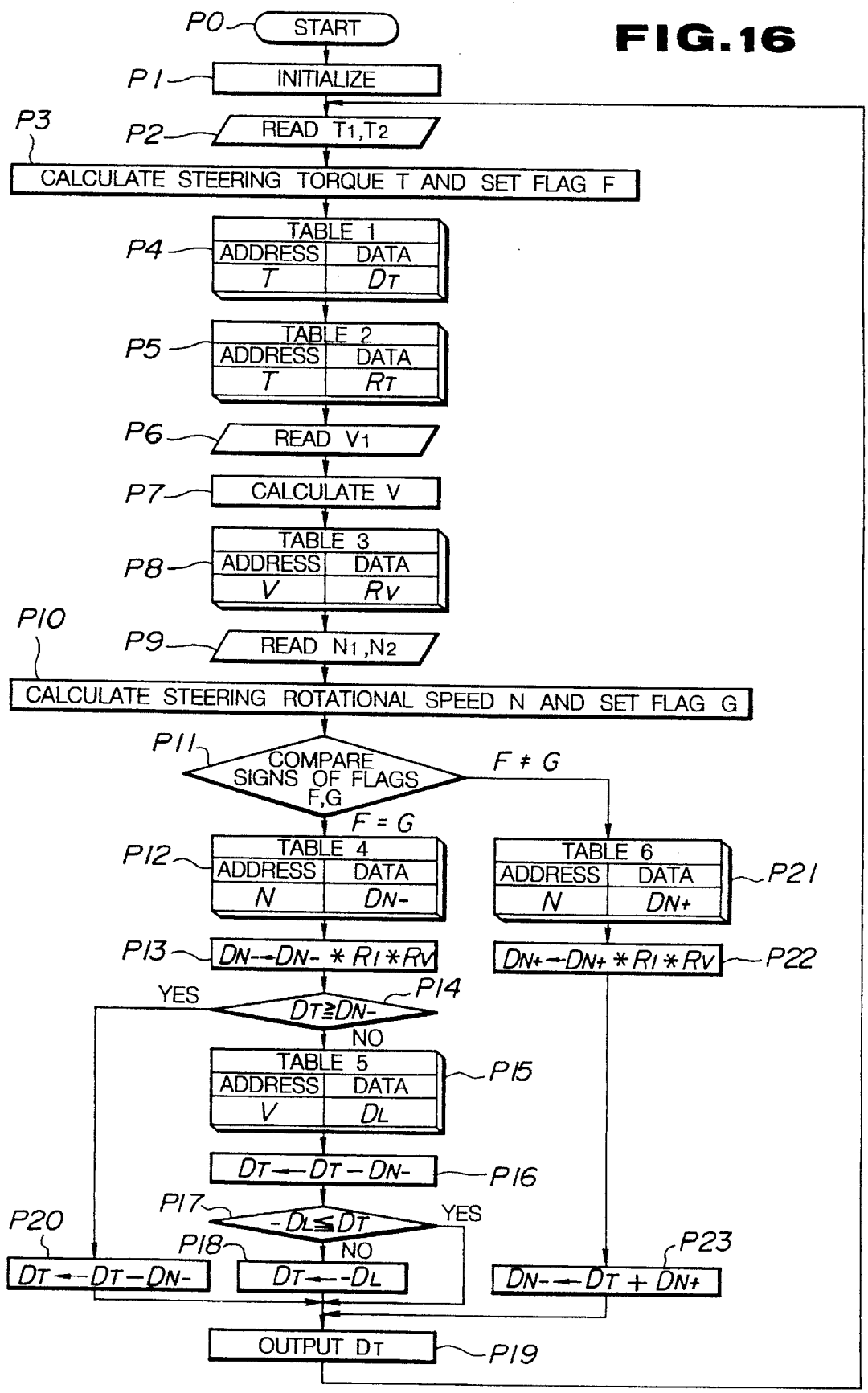
FIG. 16 is a flowchart of an operation sequence of a control means in an electrically operated power steering apparatus which is similar to the electrically operated power steering apparatus according to the third embodiment.

FIG. 16 shows an operation sequence of a control means in an electrically operated power steering apparatus which is similar to the electrically operated power steering apparatus according to the third embodiment. The operation sequence is composed of successive steps P0 through P23.

When the ignition key switch (not shown) of the electric vehicle is turned on, the control means and other circuits are energized in the step P0, the microprocessor of the control means is initialized, and the memories such as a RAM, the calculating unit, and the processor thereof are reset in the step P1.

In the step P2, steering torque signals T1, T2 are read. In the step P3, the direction in which a steering torque is applied and the magnitude of the steering torque are calculated based on the steering torque signals T1, T2, and a flag F is set as being indicative of the direction in which the steering torque is applied and the steering torque is converted into an absolute value T, the flag F and the absolute value T of the steering torque being stored in a memory.

Figure 17:
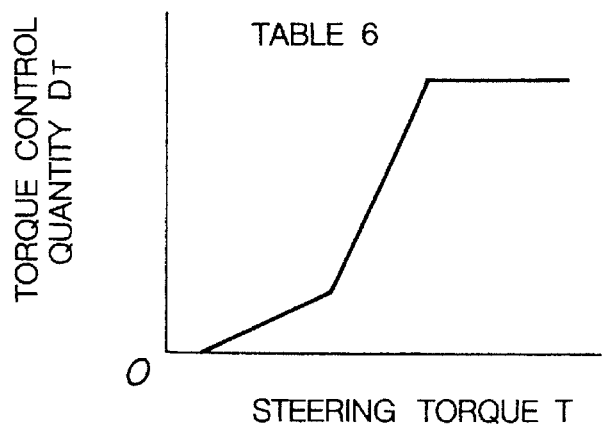
FIG. 17 is a diagram showing steering torque T vs. torque control quantity $D\gamma$ characteristics (table 6)

Then, a table 6 (see FIG. 17) which contains data representing a torque control quantity $D_T$ relative to the absolute value T of the steering torque is addressed by the absolute value T of the steering torque to read the corresponding torque control quantity $D_T$ in the step P4.

Figure 18:
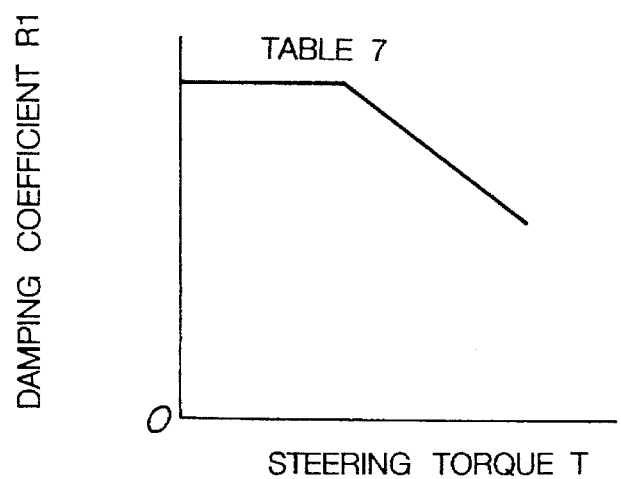
FIG. 18 is a diagram showing steering torque T vs. damping coefficient R1 characteristics (table 7)

Thereafter, a table 7 (see FIG. 18) which contains data representing a damping coefficient R1 relative to the absolute value T of the steering torque is addressed by the absolute value T of the steering torque to read the corresponding damping coefficient R1 in the step P5. The damping coefficient R1 indicates a rate of the magnitude of the damping quantity of the steering system. As shown in FIG. 18, the damping coefficient R1 is maintained at a constant level insofar as the steering torque T is smaller, and decreases as the steering torque T increases.

In the step P6, a vehicle speed signal V1 is read. Thereafter, a vehicle speed V corresponding to the vehicle speed signal V1 is calculated in the step P7.

Figure 19:
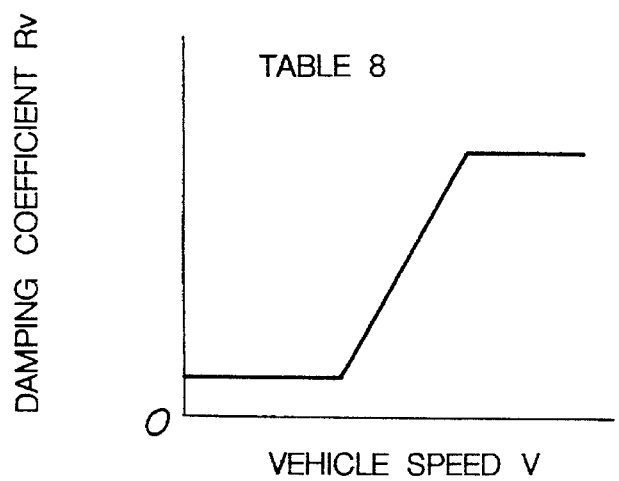
FIG. 19 is a diagram showing vehicle speed V vs. damping coefficient Rv characteristics (table 8)

A table 8 (see FIG. 19) which contains data representing a damping coefficient Rv relative to the vehicle speed V is addressed by the vehicle speed V to read the corresponding damping coefficient Rv in the step P8. The damping coefficient Rv also indicates a rate of the magnitude of the damping quantity of the steering system. As shown in FIG. 19, the damping coefficient Rv is maintained at a constant level insofar as the vehicle speed V is low, and increases as the steering torque T increases.

In the step P9, steering rotational speed signals N1, N2 are read. Then, based on the steering rotational speeds N1, N2, the magnitude and direction of a steering rotational speed are calculated based on the steering rotational speed signals N1, N2, and a flag G is set as being indicative of the direction of the steering rotation and the steering rotational speed is converted into an absolute value N, the flag F and the absolute value N of the steering rotational speed being stored in a memory.

Then, the flags F, G are compared with each other in the step P11.

Figure 20:
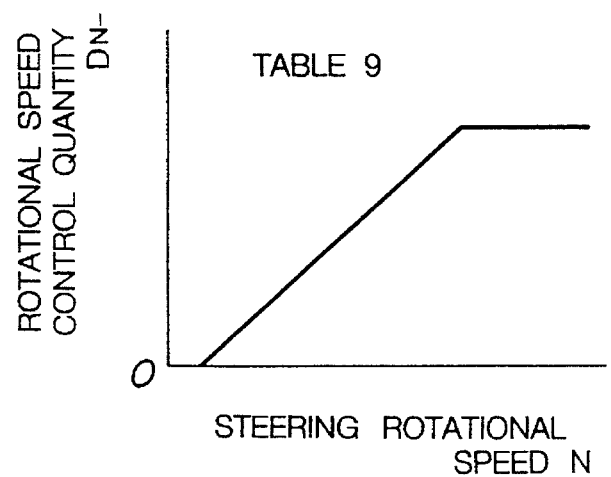
FIG. 20 is a diagram showing steering rotational speed N vs. rotational speed control quantity $D_{N-}$ characteristics (table 9)
Figure 21:
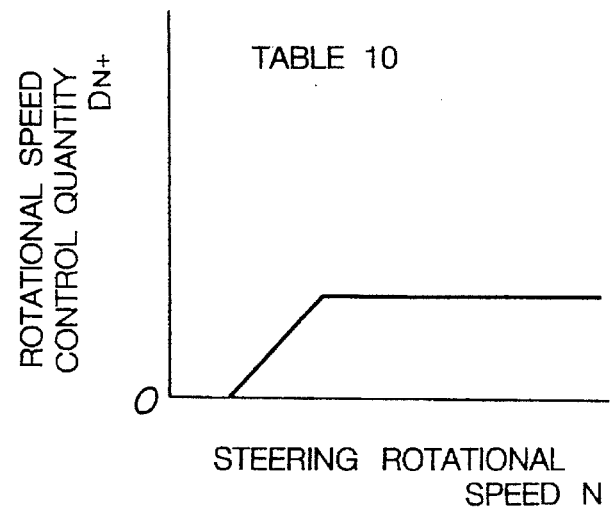
FIG. 21 is a diagram showing steering rotational speed N vs. rotational speed control quantity $D_{N+}$ characteristics (table 10)

If the flags F, G agree with each other (F=G), then the steering system is determined as being in the turned state, and control goes to the step P12. In the step P12, a table 9 (see FIG. 20) which contains data representing a rotational speed control quantity $D_{N-}$ relative to the steering rotational speed N is addressed by the steering rotational speed N to read the corresponding rotational speed control quantity $D_{N-}$. As shown in FIG. 20, the rotational speed control quantity $D_{N-}$ increases as the steering rotational speed N increases.

The rotational speed control quantity $D_{N-}$ will be deducted from the torque control quantity $D_T$, and the torque control quantity $D_T$ will be reduced depending on the steering rotational speed N in the turned state, thereby damping the steering system.

In the step P13, the rotational speed control quantity $D_{N-}$ is multiplied by the damping coefficients R1, Rv, and an optimum value depending on the steering torque and the vehicle speed is stored as the rotational speed control quantity $D_{N-}$.

The step P14 compares the rotational speed control quantity $D_{N-}$ stored in the step P13 with the torque control quantity $D_T$. If the torque control quantity $D_T$ is equal to or greater than the rotational speed control quantity $D_{N-}$ ($D_T \geq D_{N-}$), then control goes to the step P20 in which the difference between the torque control quantity $D_T$ and the rotational speed control quantity $D_{N-}$ is calculated and outputted as the torque control quantity $D_T$.

Figure 22:
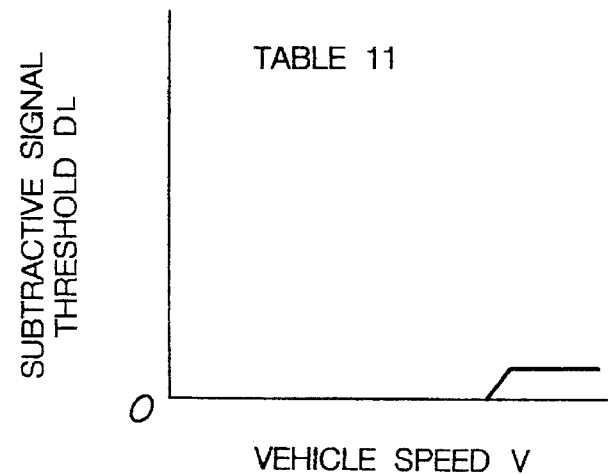
FIG. 22 is a diagram showing vehicle speed vs. subtractive signal threshold $D_L$ characteristics (table 11)

If the torque control quantity $D_T$ is smaller than the rotational speed control quantity $D_{N-}$ ($D_T < D_{N-}$), then control goes to the step P15 in which a table 11 (see FIG. 22) containing data representing a subtractive signal threshold $D_L$ relative to the vehicle speed V is addressed by the vehicle speed V to read the corresponding subtractive signal threshold $D_L$. As shown in FIG. 22, the subtractive signal threshold $D_L$ is set to 0 in low and medium vehicle speed ranges, and set to a certain value only in a high vehicle speed range.

The subtractive signal threshold $D_L$ represents a maximum value of an assistive torque in a direction opposite to the steering torque T in the high vehicle speed range. As can be seen from FIG. 22, no assistive torque is applied in the direction opposite to the steering torque T in the low vehicle speed range.

Thereafter, the difference between the torque control quantity $D_T$ and the rotational speed control quantity $D_{N-}$ is calculated and stored as a motor control signal $D_T$ in the step P16. The step P17 compares a negative motor control signal $D_T$ with a value $-D_L$ produced by multiplying the subtractive signal threshold $D_L$ by $-1$. If the absolute value of the motor control signal $D_T$ is smaller than the absolute value of the subtractive signal threshold $D_L$ ($|D_T|<|D_L|$), then an opposite assistive torque corresponding to the motor control signal $D_T$ is applied.

If the absolute value of the motor control signal $D_T$ is equal to or greater than the absolute value of the subtractive signal threshold $D_L$ ($|D_T| \geq |D_L|$) in the step P17, then control proceeds to the step P18 in which the motor control signal $D_T$ is limited to the subtractive signal threshold $D_L$ which is the maximum value of an opposite assistive torque. Then, an opposite assistive torque corresponding to the subtractive signal threshold $D_L$ is applied.

If the steering system is in the returned state (F≠G) in the step P11, then the steps P21, P22, P23 are carried out. In the steps P21, P22, P23, a damping control process for applying an assistive torque in the direction opposite to the steering torque T is not effected.

The operation sequence shown in FIG. 16 is effective to dampen the steering system more greatly depending on the vehicle speed.

As described above, the electrically operated power steering apparatus according to the first embodiment generates the motor control signal, which is the difference between the torque control quantity and the rotational speed control quantity, in the same direction as the direction of steering rotation when the steering wheel is in the turned state, and generates the motor control signal, which is the sum of the torque control quantity and the rotational speed control quantity, in the opposite direction as the direction of steering rotation when the steering wheel is in the returned state. Consequently, when the steering wheel is in the turned state, the electric motor produces an assistive steering force which decreases as the steering rotational speed increases, and when the steering wheel is in the returned state, the electric motor produces a braking force which increases as the steering rotational speed increases.

The electrically operated power steering apparatus according to the second embodiment generates the motor control signal, which is the difference between the torque control quantity and the product of the damping coefficient and the constant control quantity, in the same direction as the direction of steering rotation when the steering wheel is in the turned state, and generates the motor control signal, which is the sum of the torque control quantity and the product of the damping coefficient and the constant control quantity, in the opposite direction as the direction of steering rotation when the steering wheel is in the returned state. Consequently, when the steering wheel is in the turned state, the electric motor produces an assistive steering force which decreases as the vehicle speed increases, and when the steering wheel is in the returned state, the electric motor produces a braking force which increases as the vehicle speed increases.

The electrically operated power steering apparatus according to the third embodiment reduces the steering rotational speed depending on the vehicle speed. When the steering wheel is in the turned state, the electrically operated power steering apparatus subtracts the product of the rotational speed control quantity corresponding to the steering rotational speed and the damping coefficient from the torque control quantity to produce the motor control signal in the same direction as the direction of steering rotation, and when the steering wheel is in the returned state, the electrically operated power steering apparatus adds the product of the rotational speed control quantity corresponding to the steering rotational speed and the damping coefficient to the torque control quantity to produce the motor control signal in the opposite direction to the direction of steering rotation. Consequently, when the steering wheel is in the turned state, the electric motor produces an assistive steering force which decreases as the vehicle speed and the steering rotational speed increase, and when the steering wheel is in the returned state, the electric motor produces a braking force which increases as the vehicle speed and the steering rotational speed increase.

The correcting process may be inhibited by the correction inhibiting means in the motor control signal determining means.

The electrically operated power steering apparatus according to the fourth embodiment has the motor status detecting means for detecting and feeding back the motor current and the motor voltage which actually are supplied to and generated across the electric motor to the steering rotational speed calculating means, which then calculates and outputs the steering rotational speed, so that the electrically operated power steering apparatus can operate in the same manner as the electrically operated power steering apparatus according to the first and third embodiments, particularly the third embodiment.

In the first through fourth embodiments, as described above, the assistive steering force for the steering system is reduced and the braking force for the steering system is increased as the steering rotational speed increases, or the vehicle speed increases, or the steering rotational speed and the vehicle speed increase. Therefore, the steering system has improved steering and returning characteristics for stable steering performance.

Figure 23:
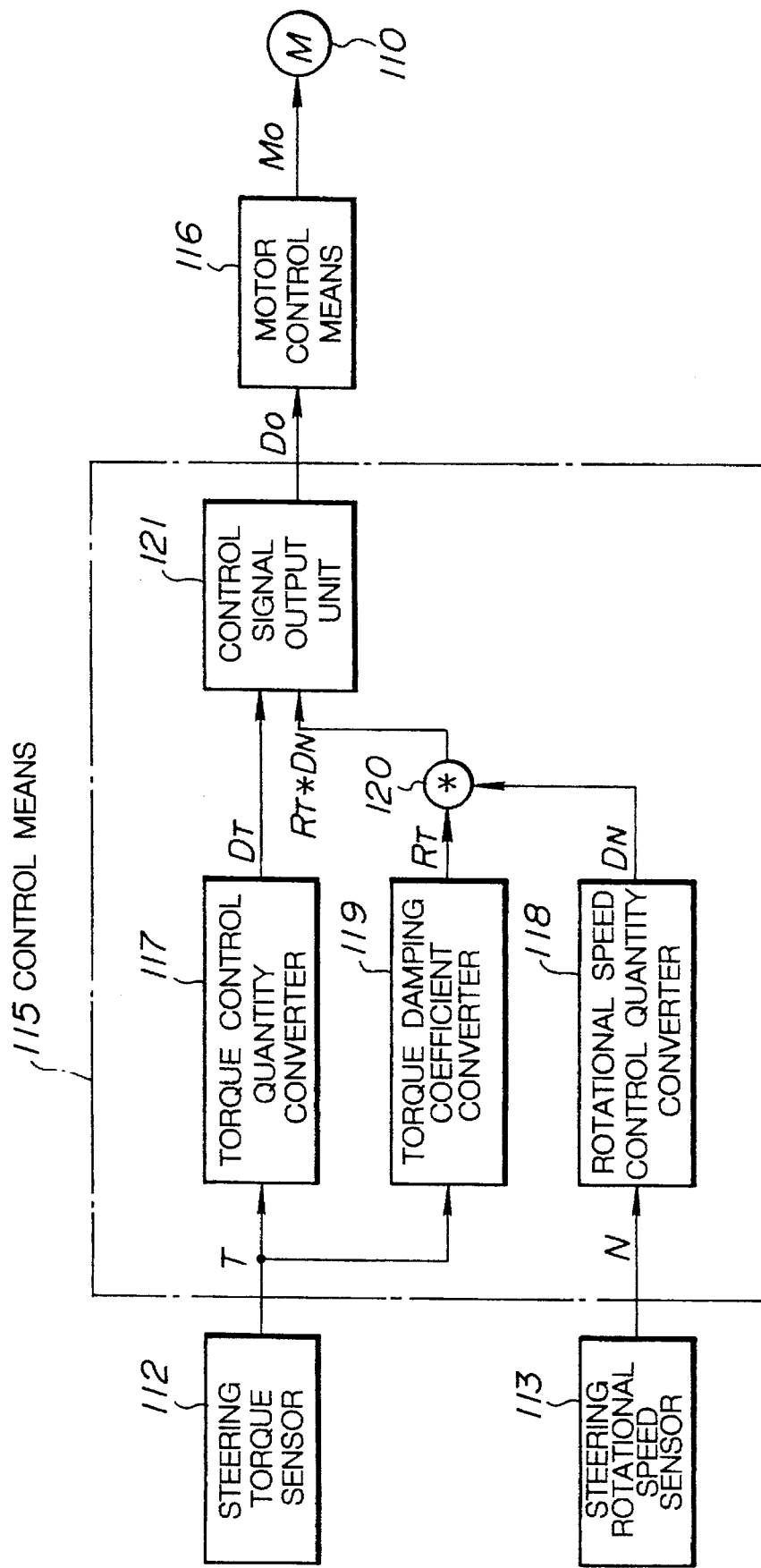
FIG. 23 is a block diagram of the electric arrangement of an electrically operated power steering apparatus according to a fifth embodiment of the present invention.

FIG. 23 shows in block form the electric arrangement of an electrically operated power steering apparatus according to a fifth embodiment of the present invention.

The electrically operated power steering apparatus shown in FIG. 23 controls a motor control signal based on a steering torque and a steering rotational speed.

As shown in FIG. 23, the electrically operated power steering apparatus comprise a steering torque sensor 112, a steering rotational speed sensor 113, a control means 115, a motor driving means 116, and an electric motor 110.

The steering torque sensor 112 and the steering rotational speed sensor 113 comprise a differential transformer as shown in FIG. 2(a) and a DC generator such as a tachometer generator or the like as shown in FIG. 2(b), respectively. The motor driving means 116 comprises an FET bridge as shown in FIG. 3.

The control means 115 basically comprises a microprocessor, and converts the absolute value of a torque signal T detected by the steering torque sensor 112 into a torque control quantity $D_T$ corresponding to the torque signal T and a torque damping coefficient $R_T$ corresponding to the torque signal T, and also converts the absolute value of a steering rotational speed signal N detected by the steering rotational speed sensor 113 into a rotational speed control quantity $D_N$ corresponding to the steering rotational speed signal N, calculates a corrective value ($R_T*D_N$) representing the product of the torque damping coefficient $R_T$ and the rotational speed control quantity $D_N$, and supplies a motor control signal ($D_T-R_T*D_N$) representative of the difference between the torque control quantity $D_T$ and the corrective value ($R_T*D_N$), as a motor control signal Do to the motor driving means 116.

The control means 115 has an A/D converting means for converting the absolute values of the torque signal T detected by the steering torque sensor 112 and the steering rotational speed signal N detected by the steering rotational speed sensor 113 into respective digital values.

The control means 115 also has an output means (not shown) for converting the motor control signal ($D_T-R_T*D_N$) into a motor control signal Do, such for example as a directional signal and a PWM signal, suitable for the motor driving means 116 to control the electric motor 110 therewith, and outputting the motor control signal Do.

The control means 115 comprises a torque control quantity converter 117, a rotational speed control quantity converter 118, a torque damping coefficient converter 119, a multiplier 120, and a control signal output unit 121.

Figure 32:
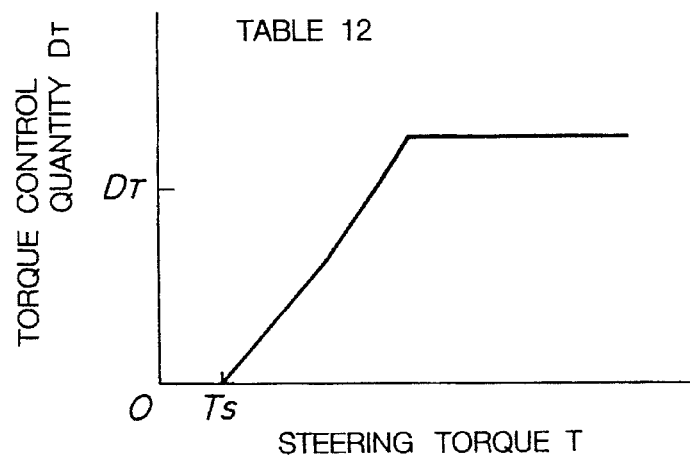
FIG. 32 is a diagram showing steering torque T vs. torque control quantity DT characteristics (table 12)

The torque control quantity converter 117 has a memory such as a ROM for storing a table 12 shown in FIG. 32, for example, representing data of the steering torque T and the torque control quantity $D_T$ as a corresponding motor control quantity, which are established based on experimental results or theoretical calculations. The torque control quantity converter 117 selects a torque control quantity $D_T$ corresponding to an inputted torque signal T as converted into a digital value, and outputs the selected torque control quantity $D_T$ as the control signal output unit 121.

Figure 35:
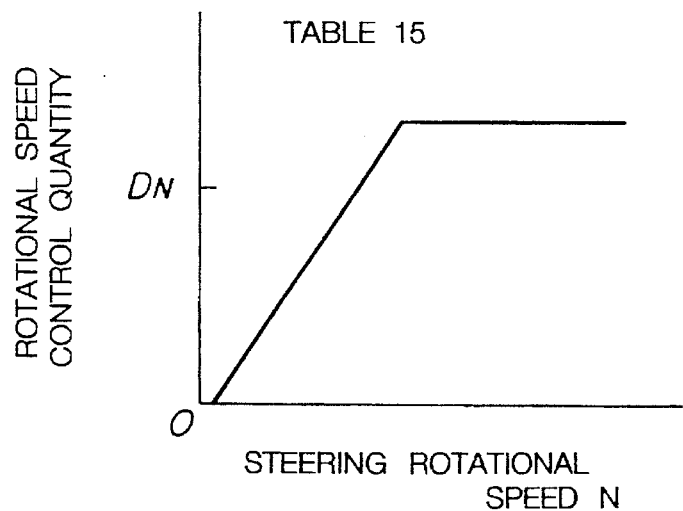
FIG. 35 is a diagram showing steering rotational speed N vs. rotational speed control quantity DN characteristics (table 15)

The rotational speed control quantity converter 118 has a memory such as a ROM for storing a table 15 shown in FIG. 35, for example, representing data of the steering rotational speed N and the rotational speed control quantity $D_N$ as a corresponding motor control quantity, which are established based on experimental results or theoretical calculations. The rotational speed control quantity converter 118 selects a rotational speed control quantity $D_N$ corresponding to an inputted steering rotational speed N as converted into a digital value, and outputs the selected rotational speed control quantity $D_N$ to the multiplier 120.

Figure 33:
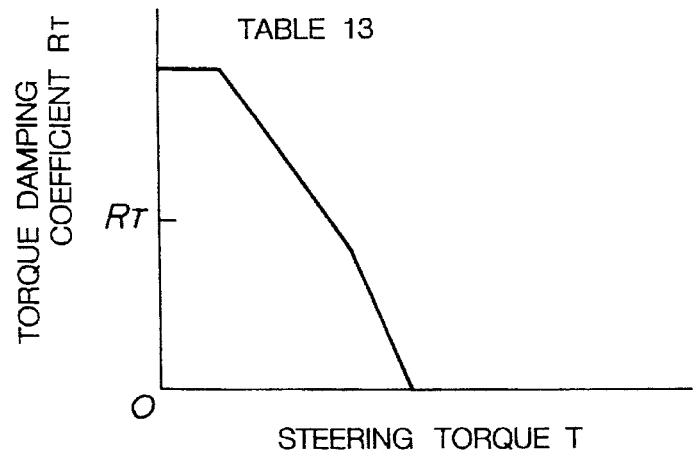
FIG. 33 is a diagram showing steering torque T vs. torque damping coefficient RT characteristics (table 13)

The torque damping coefficient converter 119 has a memory such as a ROM for storing a table 13 shown in FIG. 33, for example, representing data of the steering torque T and the torque damping coefficient $R_T$ corresponding thereto, which are established based on experimental results or theoretical calculations. The torque damping coefficient converter 119 selects a torque damping coefficient $R_T$ corresponding to an inputted torque signal T as converted into a digital value, and outputs the selected torque damping coefficient $R_T$ to the multiplier 120.

The multiplier 120 multiplies the rotational speed control quantity $D_N$ by the torque damping coefficient $R_T$ to product the corrective value ($R_T*D_N$), and outputs the corrective value signal ($R_T*D_N$) to the control signal output unit 121.

Figure 36:
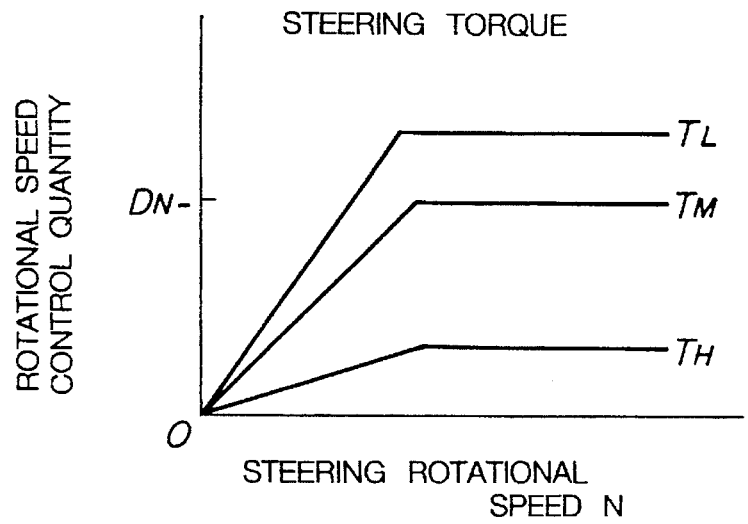
FIG. 36 is a diagram showing steering rotational speed N vs. rotational speed control quantity DN characteristics (with the steering torque as a parameter).

FIG. 36 shows the relationship between the steering rotational speed N and the rotational speed control quantity $D_N$ with the steering torque T as a parameter. As shown in FIG. 36, the rotational speed control quantity $D_N$ decreases as the steering torque T increases ($T_L \sim T_M \sim T_H$).

The control signal output unit 121 comprises a subtractor or an output buffer for supplying the motor control signal Do (directional signal+PWM signal), which represents the differential) signal ($D_T-R_T*D_N$) representative of the difference between the torque control quantity signal $D_T$ and the corrective value signal ($R_T*D_N$), to the motor driving means 116.

The motor driving means 116 generates a motor drive signal Mo based on the motor control signal Do thereby to energize the electric motor 110 to produce a required assistive steering force.

As described above, the electrically operated power steering apparatus according to the fifth embodiment effects damping correction by subtracting the corrective value ($R_T*D_N$) representing the product of the torque damping coefficient $R_T$ which decreases as the steering torque increases (see the table 13 shown in FIG. 33) and the rotational speed control quantity $D_N$ which increases as the steering rotational speed N increases (see the table 15 shown in FIG. 35), from the torque control quantity signal $D_T$ which increases as the steering torque increases (see the table 12 shown in FIG. 32). Therefore, the electrically operated power steering apparatus can produce the motor control signal Do (($D_T-R_T*D_N$) which decreases as the steering torque decreases, and the electric motor 110 can produce an assistive steering force in the same direction as the steering direction.

The term "damping correction" signifies that a steering rotational speed component in a direction opposite to the direction of steering rotation (a control quantity corresponding to the rotational speed control quantity) is given to the torque control quantity.

Figure 24:
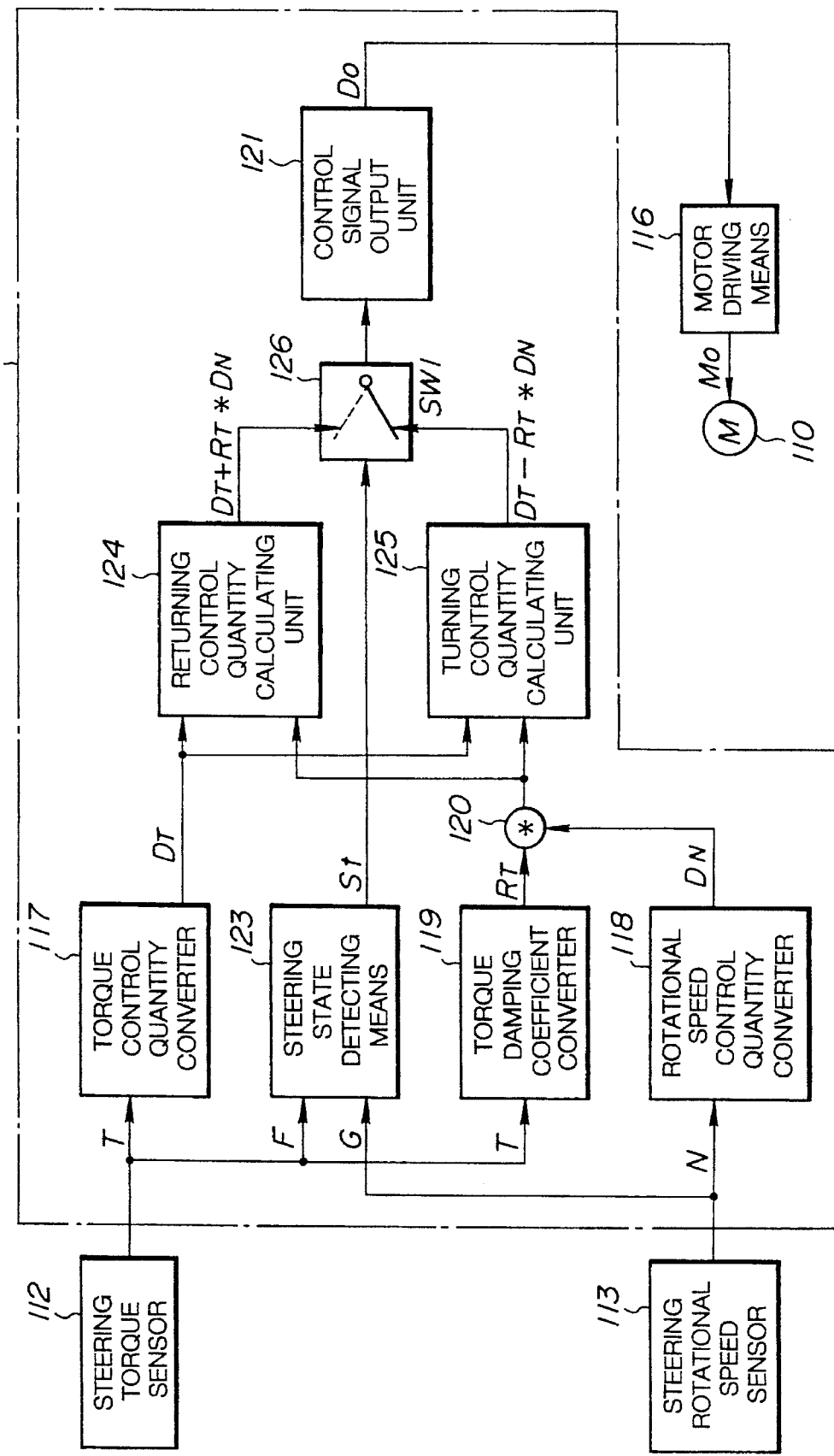
FIG. 24 is a block diagram of the electric arrangement of an electrically operated power steering apparatus according to a fifth embodiment of the present invention.

FIG. 24 shows in block form the electric arrangement of an electrically operated power steering apparatus according to a sixth embodiment of the present invention.

The electrically operated power steering apparatus shown in FIG. 24 controls a motor control signal based on a steering torque, a steering rotational speed, and a steering state.

The electrically operated power steering apparatus shown in FIG. 24 comprises a steering torque sensor 112, a steering rotational speed sensor 113, a control means 122, a motor driving means 116, and an electric motor 110, and differs from the electrically operated power steering apparatus shown in FIG. 23 only with respect to the control means 122.

The control means 122 basically comprises a microprocessor, and converts the absolute value of a torque signal T detected by the steering torque sensor 112 into a torque control quantity $D_T$ corresponding to the torque signal T and a torque damping coefficient $R_T$ corresponding to the torque signal T, and also converts the absolute value of a steering rotational speed signal N detected by the steering rotational speed sensor 113 into a rotational speed control quantity $D_N$ corresponding to the steering rotational speed signal N, calculates a corrective value ($R_T*D_N$) representing the product of the torque damping coefficient $R_T$ and the rotational speed control quantity $D_N$, and supplies a motor control signal Do (directional signal+PWM signal), which is a differential signal ($D_T-R_T*D_N$) representative of the difference between the torque control quantity signal $D_T$ and the corrective value signal ($R_T*D_N$), to the motor driving means 116 when a steering state signal St indicates the turned state, and supplies a motor control signal Do (directional signal+PWM signal), which is a sum signal ($D_T+R_T*D_N$) representative of the sum of the torque control quantity signal $D_T$ and the corrective value signal ($R_T*D_N$), to the motor driving means 116 when the steering state signal St indicates the returned state.

The control means 122 has an A/D converting means, a direction determining means, etc. (not shown) for converting the absolute values of the torque signal T detected by the steering torque sensor 112 and the steering rotational speed signal N detected by the steering rotational speed sensor 113 into respective digital values, and detecting directions as flags F, G.

The control means 122 comprises a torque control quantity converter 117, a rotational speed control quantity converter 118, a torque damping coefficient converter 119, a multiplier 120, a control signal output unit 121, a steering state detecting means 123, a returning control quantity calculating unit 124, a turning control quantity calculating unit 125, and a switch (SW1) 126.

The torque control quantity converter 117, the rotational speed control quantity converter 118, the torque damping coefficient converter 119, the multiplier 120, the control signal output unit 121 are identical to those of the control means 115 shown in FIG. 23, and will not be described in detail below.

The steering state detecting means 123 detects a turned or returned state of the steering wheel 1 based on the directional flag F of the torque signal and the flag G of the steering rotational speed signal N, and supplies a steering state signal St, which is of a high (H) level indicative of the turned state of the steering wheel 1 or a low (L) level indicative of the returned state of the steering wheel 1, to the switch (SW1) 126.

The turned or returned state is detected based on the signs of the flags F, G. If the signs of the flags F, G agree with each other (F=G), then the steering wheel 1 is determined as being in the turned state. If the signs of the flags F, G do not agree with each other (F≠G), then the steering wheel 1 is determined as being in the returned state.

The returning control quantity calculating unit 124 adds the corrective value signal ($R_T*D_N$) to the torque control quantity signal $D_T$ to supply a motor control signal ($D_T+R_T*D_N$) to the switch (SW1) 126.

The turning control quantity calculating unit 125 subtracts the corrective value signal ($R_T*D_N$) from the torque control quantity signal $D_T$ to supply a motor control signal ($D_T-R_T*D_N$) to the switch (SW1) 126.

The switch (SW1) 126 serves to switch between the motor control signal ($D_T+R_T*D_N$) and the motor control signal ($D_T-R_T*D_N$). If the steering state signal St supplied from the steering state detecting means 123 is of an L level indicating the returned state, the switch (SW1) 126 selects the motor control signal ($D_T+R_T*D_N$) from the returning control quantity calculating unit 124 and supplies the motor control signal ($D_T+R_T*D_N$) to the control signal output unit 121. If the steering state signal St supplied from the steering state detecting means 123 is of an H level indicating the turned state, the switch (SW1) 126 selects the motor control signal ($D_T-R_T*D_N$) from the turning control quantity calculating unit 125 and supplies the motor control signal ($D_T-R_T*D_N$) to the control signal output unit 121.

The control signal output unit 121 converts each of the motor control signal ($D_T+R_T*D_N$) and the motor control signal ($D_T-R_T*D_N$) into the motor control signal Do (directional signal+PWM signal), and supplies the motor control signal Do to the motor driving means 116.

Based on the motor control signal Do, the motor driving means 116 generates a motor drive signal Mo to energize the electric motor 110 in a PWM mode for thereby producing an assistive steering force.

As described above, the electrically operated power steering apparatus according to the sixth embodiment subtracts the corrective value ($R_T*D_N$) representing the product of the torque damping coefficient $R_T$ which decreases as the steering torque increases (see the table 13 shown in FIG. 33) and the rotational speed control quantity $D_N$ which increases as the steering rotational speed N increases (see the table 15 shown in FIG. 35), from the torque control quantity signal $D_T$ which increases as the steering torque increases (see the table 12 shown in FIG. 32) when the steering system is in the turned state, and adds the corrective value ($R_T*D_N$) to the torque control quantity signal $D_T$ when the steering system is in the returned state. Therefore, the electrically operated power steering apparatus can produce the motor control signal Do (($D_T-R_T*D_N$) which decreases as the steering rotational speed N increases and the steering torque decreases, enabling the electric motor 110 to produce an assistive steering force in the same direction as the steering direction, when the steering system is in the turned state, and also can produce the motor control signal Do (($D_T+R_T*D_N$) which increases as the steering rotational speed N increases and the steering torque decreases, enabling the electric motor 110 to produce an assistive steering force in the opposite direction as the steering direction, when the steering system is in the returned state.

Figure 25:
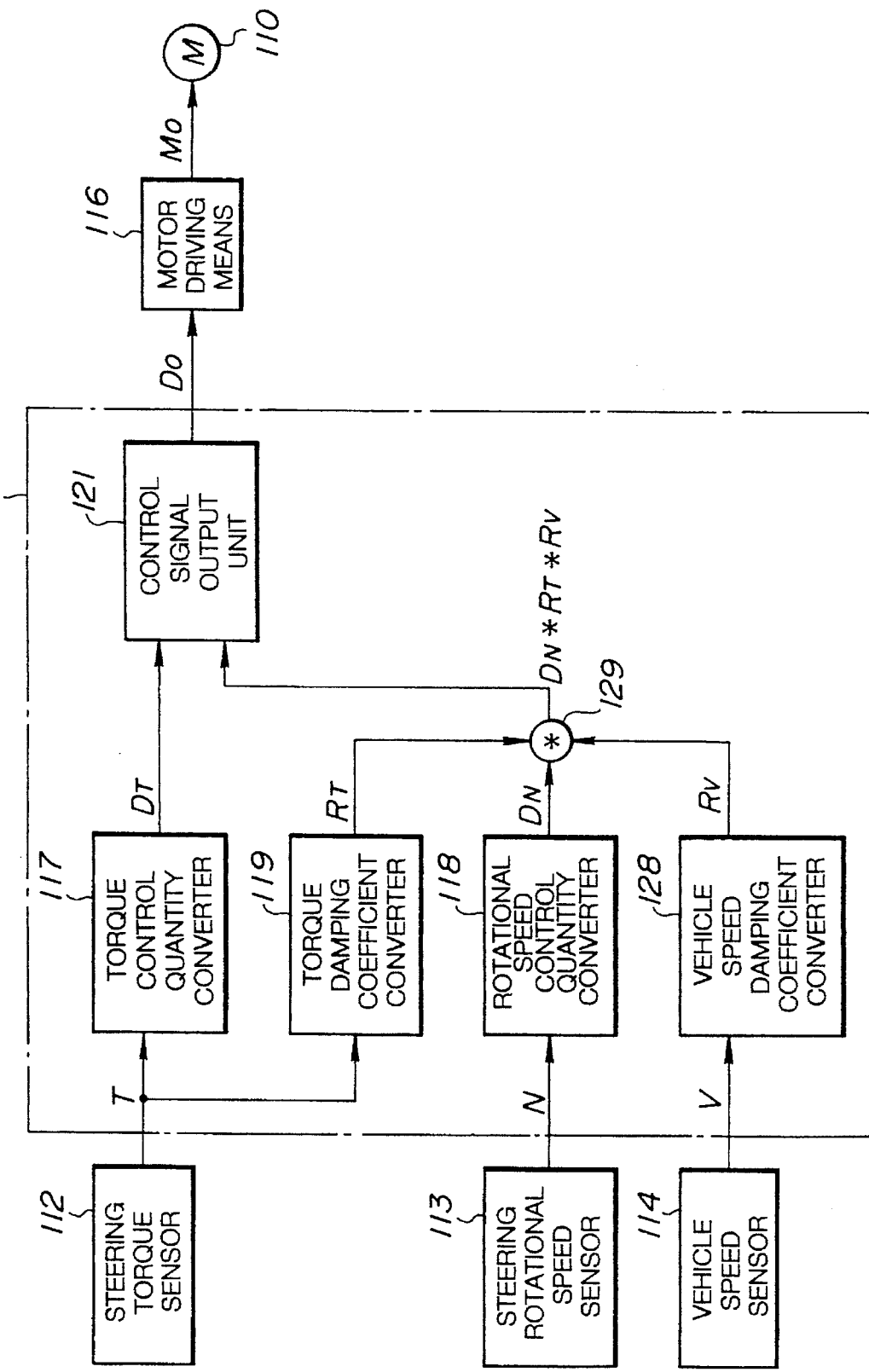
FIG. 25 is a block diagram of the electric arrangement of an electrically operated power steering apparatus according to a seventh embodiment of the present invention.

FIG. 25 shows in block form the electric arrangement of an electrically operated power steering apparatus according to a seventh embodiment of the present invention.

The electrically operated power steering apparatus shown in FIG. 25 controls a motor control signal based on a steering torque, a steering rotational speed, and a vehicle speed.

The electrically operated power steering apparatus shown in FIG. 25 differs from the electrically operated power steering apparatus shown in FIG. 23 in that a vehicle speed sensor 114 is connected to a control means 127, and the control mans 127 additionally has a vehicle speed damping coefficient converter 128 and a three-input multiplier 129 are added.

The vehicle speed sensor 114 comprises a speedometer composed of a rotating disk having slits and a photocoupler, as shown in FIG. 2(c).

Figure 34:
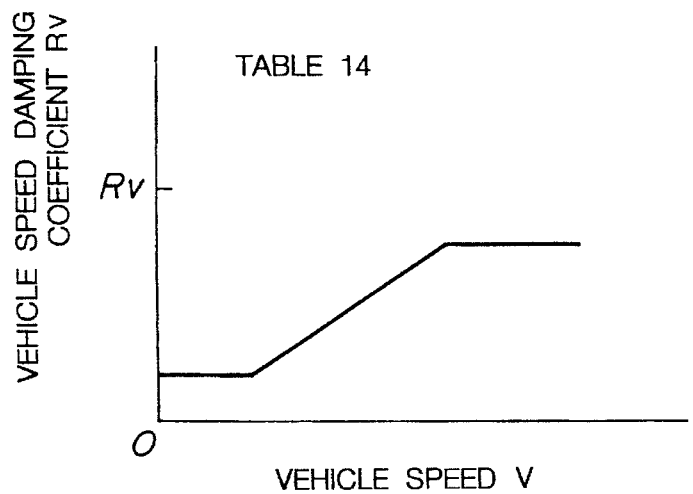
FIG. 34 is a diagram showing vehicle speed V vs. vehicle speed damping coefficient Rv characteristics (table 14)

The vehicle speed damping coefficient converter 128 has a memory such as a ROM for storing a table 14 shown in FIG. 34, for example, representing data of a vehicle speed damping coefficient Rv and the vehicle speed V corresponding thereto, which are established based on experimental results or theoretical calculations. The vehicle speed damping coefficient converter 128 selects a vehicle speed damping coefficient Rv corresponding to an inputted vehicle speed V as converted into a digital value, and outputs the selected vehicle speed damping coefficient Rv to the multiplier 129.

The multiplier 129 multiplies the torque damping coefficient $R_T$, the rotational speed control quantity $D_N$, and the vehicle speed damping coefficient Rv to produce a corrective value ($R_T*Rv*D_N$), and outputs a corrective value signal ($R_T*Rv*D_N$) to the control signal output unit 121.

The control signal output unit 121 comprises a subtractor or an output buffer for supplying the motor control signal Do (directional signal+PWM signal), which represents the differential signal ($D_T-R_T*Rv*D_N$) representative of the difference between the torque control quantity signal $D_T$ and the corrective value signal ($R_T*Rv*D_N$), to the motor driving means 116.

The motor driving means 116 generates a motor drive signal Mo based on the motor control signal Do thereby to energize the electric motor 110 to produce a required assistive steering force.

As described above, the electrically operated power steering apparatus according to the seventh embodiment effects damping correction by subtracting the corrective value ($R_T*Rv*D_N$) representing the product of the torque damping coefficient $R_T$ which decreases as the steering torque increases, the rotational speed control quantity $D_N$ which increases as the steering rotational speed N increase, and the vehicle speed damping coefficient Rv which increases as the vehicle speed V increases, from the torque control quantity signal $D_T$ which increases as the steering torque increases. Therefore, the electrically operated power steering apparatus can produce the motor control signal Do (($D_T-R_T*Rv*D_N$) which decreases as the steering rotational speed N and the vehicle speed V increase and increases as the steering torque decreases, and the electric motor 110 can produce an assistive steering force in the same direction as the steering direction.

The term "damping correction" signifies that a steering rotational speed component in a direction opposite to the direction of steering rotation (a control quantity corresponding to the rotational speed control quantity) is given to the torque control quantity.

Figure 26:
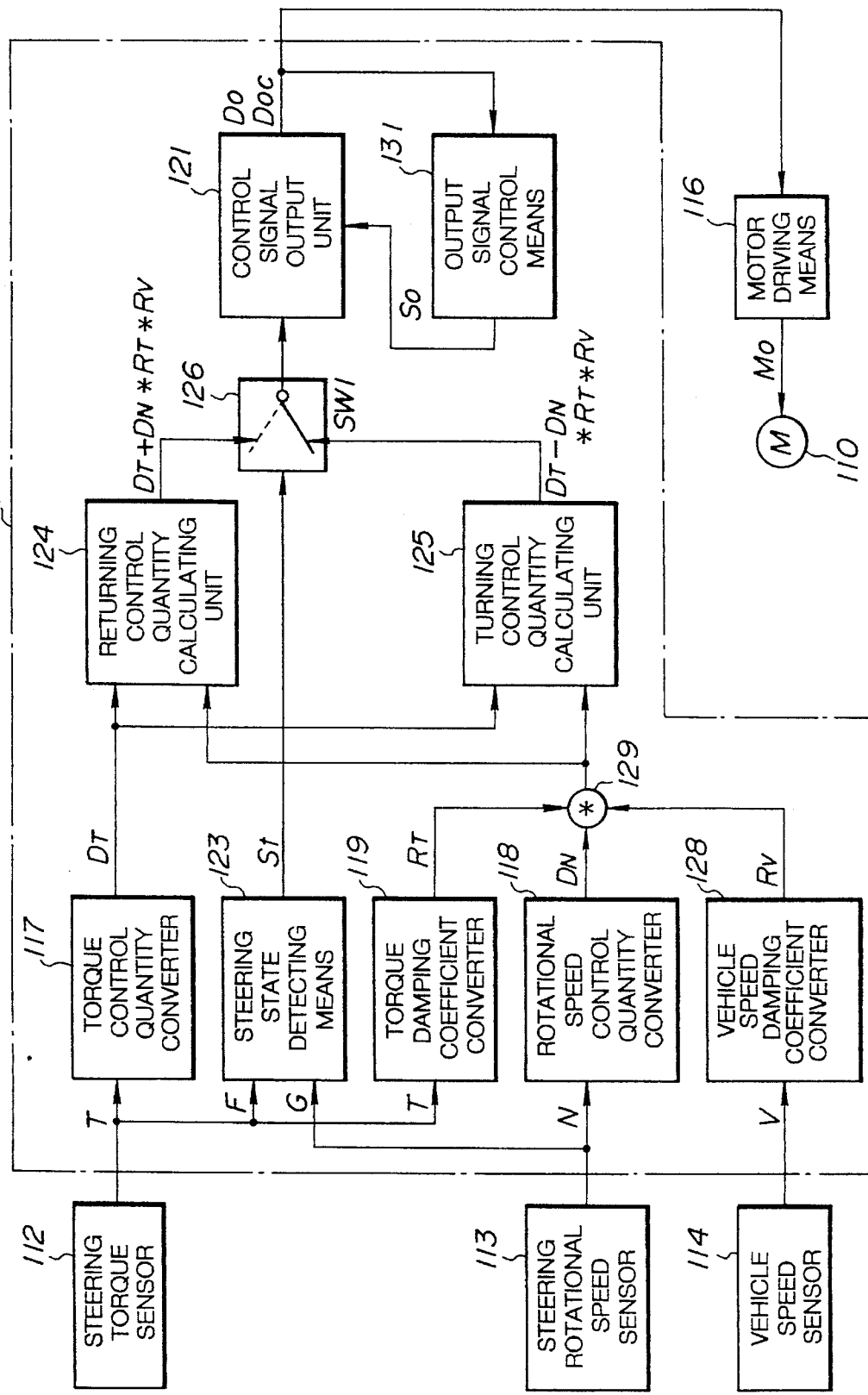
FIG. 26 is a block diagram of the electric arrangement of an electrically operated power steering apparatus according to a eighth embodiment of the present invention.

FIG. 26 shows in block form the electric arrangement of an electrically operated power steering apparatus according to an eighth embodiment of the present invention.

The electrically operated power steering apparatus shown in FIG. 26 controls a motor control signal based on a steering torque, a steering rotational speed, a vehicle speed, and a steering state.

The electrically operated power steering apparatus shown in FIG. 26 differs from the electrically operated power steering apparatus shown in FIG. 25 in that its control means 130 additionally includes a steering state detecting means 123, a returning control quantity calculating unit 124, a turning control quantity calculating unit 125, a switch (SW1) 126, and an output signal control means 131.

The steering state detecting means 123, the returning control quantity calculating unit 124, the turning control quantity calculating unit 125, and the switch (SW1) 126 are identical to those in the control means 122 shown in FIG. 24.

The returning control quantity calculating unit 124 adds the corrective value signal ($R_T*Rv*D_N$) to the torque control quantity signal $D_T$ to supply a motor control signal ($D_T+R_T*Rv*D_N$) to the switch (SW1) 126.

The turning control quantity calculating unit 125 subtracts the corrective value signal ($R_T*Rv*D_N$) from the torque control quantity signal $D_T$ to supply a motor control signal ($D_T-R_T*Rv*D_N$) to the switch (SW1) 126.

The switch (SW1) 126 serves to switch between the motor control signal ($D_T+R_T*Rv*D_N$) and the motor control signal ($D_T-R_T*Rv*D_N$). If the steering state signal St supplied from the steering state detecting means 123 is of an L level indicating the returned state, the switch (SW1) 126 selects the motor control signal ($D_T+R_T*Rv*D_N$) from the returning control quantity calculating unit 124 and supplies the motor control signal ($D_T+R_T*Rv*D_N$) to the control signal output unit 121. If the steering state signal St supplied from the steering state detecting means 123 is of an H level indicating the turned state, the switch (SW1) 126 selects the motor control signal ($D_T-R_T*Rv*D_N$) from the turning control quantity calculating unit 125 and supplies the motor control signal ($D_T-R_T*Rv*D_N$) to the control signal output unit 121.

The control signal output unit 121 converts each of the motor control signal ($D_T+R_T*Rv*D_N$) and the motor control signal ($D_T-R_T*Rv*D_N$) into the motor control signal Do (directional signal+PWM signal), and supplies the motor control signal Do to the motor driving means 116.

Based on the motor control signal Do, the motor driving means 116 generates a motor drive signal Mo to energize the electric motor 110 in a PWM mode for thereby producing an assistive steering force.

The output signal control means 131 receives the motor control signal Do (directional signal+PWM signal) from the control signal output unit 121, compares the level of the motor control signal Do with a reference value including 0, and supplies the control signal output unit 121 with a control signal So for reversing the directional signal of the motor control signal Do, or inhibiting the correcting process, or establishing a short circuit between the input terminals of the electric motor 110 to enable the control signal output unit 121 to output a motor control signal Doc indicative of the reversed directional signal of the motor control signal Do, or the inhibited correcting process, or the established short circuit between the input terminals of the electric motor 110, to the motor driving means 116.

The output signal control means 131 shown in FIG. 26 may be incorporated in the control means 115 shown in FIG. 23, the control means 122 shown in FIG. 24, and the control means 127 shown in FIG. 25.

Figure 27:
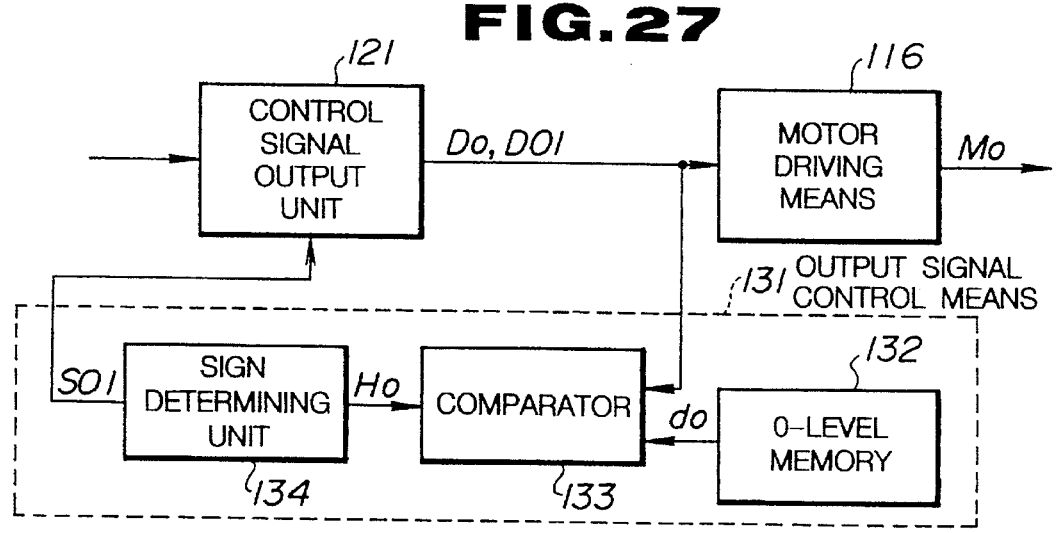
FIG. 27 is a block diagram of a first specific arrangement for use as an output signal control means in the electrically operated power steering apparatus shown in FIG. 26.

FIG. 27 shows in block form a first specific arrangement for use as the output signal control means 131 in the electrically operated power steering apparatus shown in FIG. 26.

As shown in FIG. 27, the output signal control means 131 comprises a 0-level memory 132, a comparator 133, and a sign determining unit 134. The comparator 133 receives the motor control signal Do (directional signal+PWM signal) from the control signal output unit 121, compares the level of the motor control signal Do with a level signal (0 level)

do from the 0-level memory 132, and supplies a comparison signal Ho to the sign determining unit 134.

If the level of the motor control signal Do (directional signal+PWM signal) is equal to or greater than the level signal (0 level) do (Do≧0), then the sign determining unit 134 supplies the control signal output unit 121 with a determined sign signal So1 representing a sign which is the same as that of the directional signal of the motor control signal Do, controlling the control signal output unit 121 to output a motor control signal Do1 (=Do).

If the level of the motor control signal Do (directional signal+PWM signal) is lower than the level signal (0 level) do (Do<0), then the sign determining unit 134 supplies the control signal output unit 121 with a determined sign signal So1 representing a sign which is opposite to that of the directional signal of the motor control signal Do, controlling the control signal output unit 121 to output a motor control signal Do1 corresponding to the determined sign signal So1.

Figure 28:
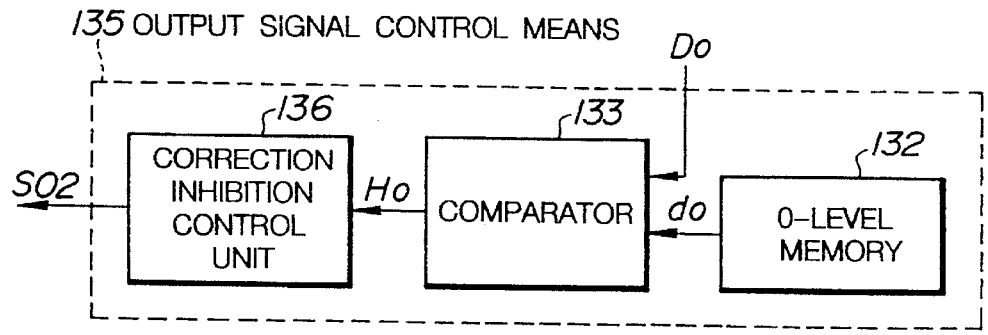
FIG. 28 is a block diagram of a second specific arrangement for use as an output signal control means in the electrically operated power steering apparatus shown in FIG. 26.

FIG. 28 shows in block form a second specific arrangement for use as the output signal control means in the electrically operated power steering apparatus shown in FIG. 26.

As shown in FIG. 28, the output signal control means, denoted by 135, comprises a 0-level memory 132, a comparator 133, and a correction inhibition control unit 136. If the level of the motor control signal Do from the control signal output unit 121 is equal to or lower than the 0 level (Do≦0), then the correction inhibition control unit 136 outputs a correction inhibition control signal So2 which equalizes the motor control signal Do1 from the control signal output unit 121 to the 0 level.

Figure 29:
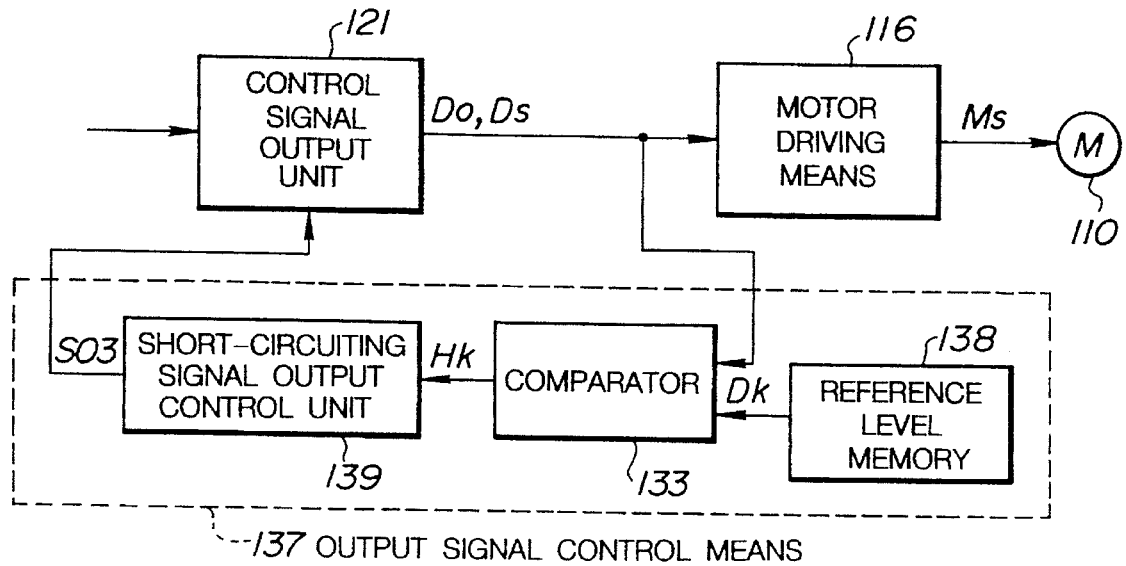
FIG. 29 is a block diagram of a third specific arrangement for use as an output signal control means in the electrically operated power steering apparatus shown in FIG. 26.

FIG. 29 shows in block form a third specific arrangement for use as the output signal control means in the electrically operated power steering apparatus shown in FIG. 26.

As shown in FIG. 29, the output signal control means, denoted by 137, comprises a reference level memory 138, a comparator 133, and a short-circuiting signal output control unit 139. If the level of the motor control signal Do is equal to or lower than a reference level Dk (Do≦Dk), then the comparator 133 supplies a comparison signal Hk to the short-circuiting signal output control unit 139. The short-circuiting signal output control unit 139 outputs a short-circuiting signal So3 which enables the control signal output unit 121 to output a motor control signal Ds to short-circuit the input terminals of the electric motor 110.

A short circuit may be established between the input terminals of the electric motor 110 by the motor control signals Ds which simultaneously turns on the FETs Q1, Q4 or the FETs Q2, Q3 of the FET bridge of the motor driving means 116.

As described above, the electrically operated power steering apparatus according to the eighth embodiment subtracts the corrective value ($R_T*Rv*D_N$) representing the product of the torque damping coefficient $R_T$ which decreases as the steering torque increases, the rotational speed control quantity $D_N$ which increases as the steering rotational speed N increases, and the vehicle speed damping coefficient Rv which increases as the vehicle speed V increases, from the torque control quantity signal $D_T$ which increases as the steering torque increases when the steering system is in the turned state, and adds the corrective value ($R_T*Rv*D_N$) to the torque control quantity signal $D_T$ when the steering system is in the returned state. Therefore, the electrically operated power steering apparatus can produce the motor control signal Do (($D_T-R_T*Rv*D_N$) which decreases as the steering rotational speed N and the vehicle speed increase and the steering torque decreases, enabling the electric motor 110 to produce an assistive steering force in the same direction as the steering direction, when the steering system is in the turned state, and also can produce the motor control signal Do (($D_T+R_T*Rv*D_N$) which increases as the steering rotational speed N and the vehicle speed increase and the steering torque decreases, enabling the electric motor 110 to produce an assistive steering force in the opposite direction as the steering direction, when the steering system is in the returned state.

The output signal control means 131 is effective to output a motor control signal for producing an assistive steering force in the direction opposite to the steering torque, inhibiting the correcting process (outputting the 0 level), or short-circuiting the input terminals of the electric motor 110 to electromagnetically brake the electric motor 110 thereby to control the assistive steering force generated by the electric motor 110.

Figure 30:
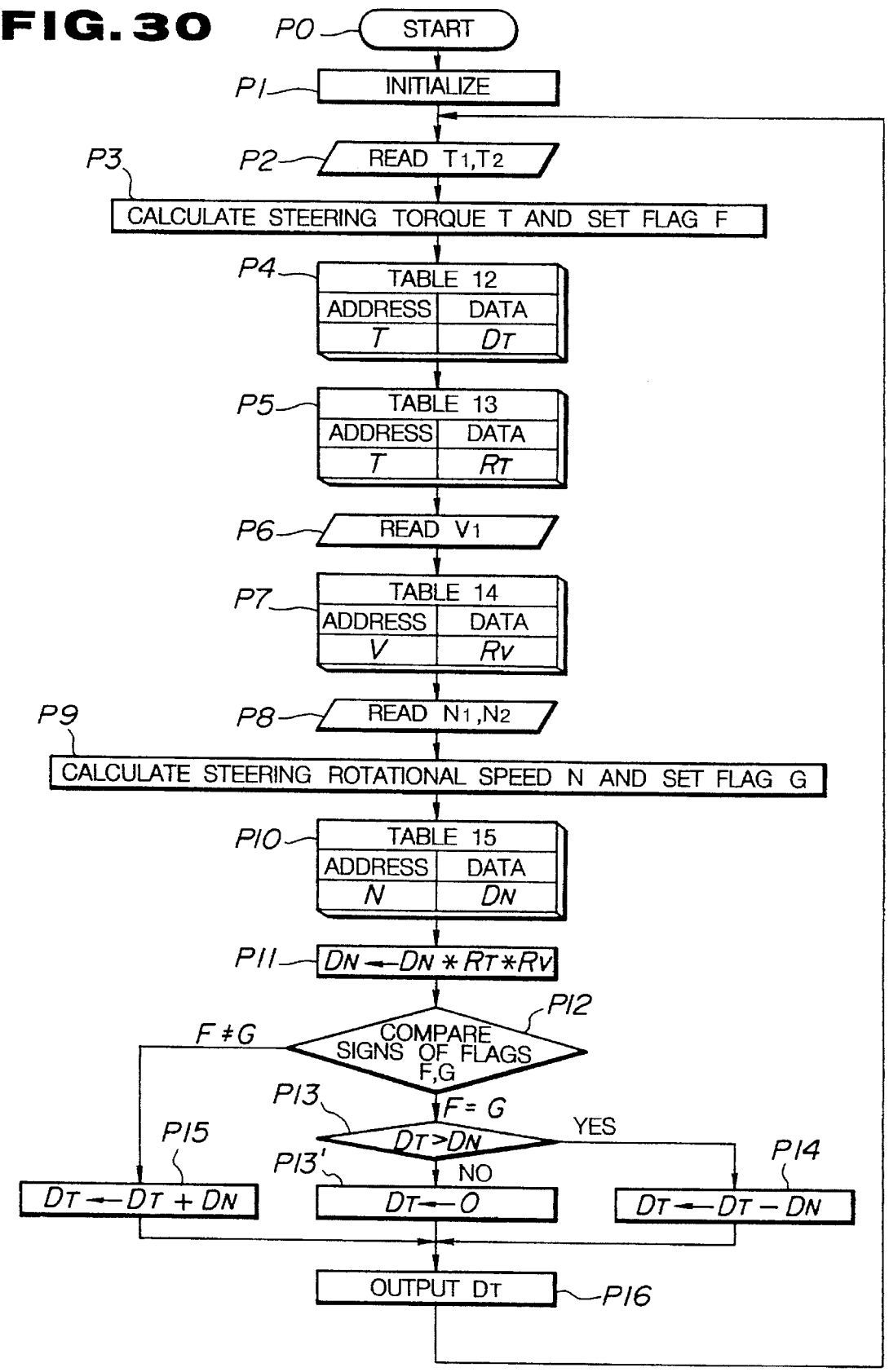
FIG. 30 is a flowchart of a first operation sequence of a control means in the electrically operated power steering apparatus shown in FIG. 26.

FIG. 30 shows a first operation sequence of the control means 130 in the electrically operated power steering apparatus shown in FIG. 26. The first operation sequence is composed of successive steps P0 through P16 which are carried out by the control means 130, typically comprising a microprocessor.

When the ignition key switch (not shown) of the electric vehicle is turned on, the control means 130 is energized and starts operating in the step P0.

First, the microprocessor of the control means 130 starts carrying out its control process. The microprocessor sends a control signal such as a power-on reset signal or the like to various parts of the control means 130 to reset or initialize the same in the step P1.

When the steering wheel 1 is operated, steering torque signals T1, T2 representing an analog steering torque and a direction of steering rotation detected by the steering torque sensor 112 are read in the step P2. The read steering torque signals T1, T2 are converted by an A/D converter into a digital torque signal T and a flag F indicative of the direction of the steering torque in the step P3.

The digital torque signal T is then converted into a torque control quantity $D_T$ based on the data of a table 12 (see FIG. 32) stored in the memory of the torque control quantity converter 117, and the torque control quantity $D_T$ is outputted to the returning control quantity calculating unit 124 and the turning control quantity calculating unit 125 in the step P4.

The digital torque signal T is also converted into a torque damping coefficient $R_T$ based on the data of a table 14 (see FIG. 34) stored in the memory of the torque damping coefficient converter 119, and the torque damping coefficient $R_T$ is outputted to the multiplier 129 in the step P5.

Then, an analog vehicle speed signal V1 detected by the vehicle speed sensor 114 is converted by an A/D converter into a digital vehicle speed signal V in the step P6. Thereafter, the digital vehicle speed signal V is converted into a corresponding damping coefficient Rv based on the data of the table 3 (see FIG. 12) stored in the memory of the vehicle speed damping coefficient converter 128, and the damping coefficient Rv is outputted to the multiplier 129 in the step P7.

Steering rotational speed signals N1, N2 representing an analog steering rotational speed and a direction of steering rotation detected by the steering rotational speed sensor 113 are read in the step P8. The read steering rotational speed signals N1, N2 are converted by an A/D converter into a digital steering rotational speed signal N and a flag G indicative of the direction of steering rotation in the step P9.

The steering rotational speed signal N is converted into a rotational speed control quantity $D_N$ based on the data of a table 15 (see FIG. 35) stored in the memory of the rotational speed control quantity converter 118, and the rotational speed control quantity $D_N$ is outputted to the multiplier 129 in the step P10.

The multiplier 129 multiplies the torque damping coefficient $R_T$, the rotational speed control quantity $D_N$, and the vehicle speed damping coefficient Rv to produce a corrective value ($R_T$*Rv*$D_N$), and outputs the corrective value ($R_T$*Rv*$D_N$) as a new rotational speed control quantity $D_N$ to the returning control quantity calculating unit 124 and the turning control quantity calculating unit 125 in the step P11.

The returning control quantity calculating unit 124 adds the corrective value ($R_T$*Rv*$D_N$) from the multiplier 129 to the torque control quantity signal $D_T$ to supply a motor control signal ($D_T$+$R_T$*Rv*$D_N$) for the returned state to the switch (SW1) 126. The turning control quantity calculating unit 125 subtracts the corrective value signal ($R_T$*Rv*$D_N$) from the torque control quantity signal $D_T$ to supply a motor control signal ($D_T$−$R_T$*Rv*$D_N$) for the turned state to the switch (SW1) 126.

Then, the sign of the flag F converted in the step P3 and the sign of the flag G converted in the step P9 are compared with each other by the steering state detecting means 123 in the step P12.

If the signs agree with each other (F=G), then the steering state detecting means 123 determines that the steering wheel 1 is in the turned state and controls the switch (SW1) 126 to be connected to the turning control quantity calculating unit 125, and the control quantity $D_T$ of the motor control signal ($D_T$−$R_T$*Rv*$D_N$) for the turned state is compared with the corrective value $D_N$ ($R_T$*Rv*$D_N$) by the output signal control means 131 in the step P13. If the control quantity $D_T$ is equal to or smaller than the corrective value $D_N$ ($D_T \leq D_N$), then the correction process is inhibited, the motor control signal ($D_T$−$R_T$*Rv*$D_N$) is set to a new motor control signal $D_T$ (=0) in the step P13'. Thereafter, the control signal output unit 121 outputs the motor control signal $D_T$ (Do=0) in the step P16.

The output signal control means 131 used here is the output signal control means 135 with the correction inhibition control unit 136 shown in FIG. 28.

If the control quantity $D_T$ of the motor control signal ($D_T$−$R_T$*Rv*$D_N$) for the turned state is greater than the corrective value $D_N$ ($R_T$*Rv*$D_N$), then a motor control signal ($D_T$−$D_N$) set in the step P14 is outputted as the motor control signal $D_T$ from the control signal output unit 121 in the step P16.

If the signs do not agree with each other (F≠G), then the steering state detecting means 123 determines that the steering wheel 1 is in the returned state and controls the switch (SW1) 126 to be connected to the returning control quantity calculating unit 124, and a motor control signal $D_T$ (=Do=$D_T$+$D_N$) representing the sum (set in the step P15) of the torque control quantity $D_T$ calculating by the returning control quantity calculating unit 124 and the corrective value $D_N$ ($R_T$*Rv*$D_N$) is outputted as the motor control quantity $D_T$ from the control signal output unit 121 in the step P16.

Figure 31:
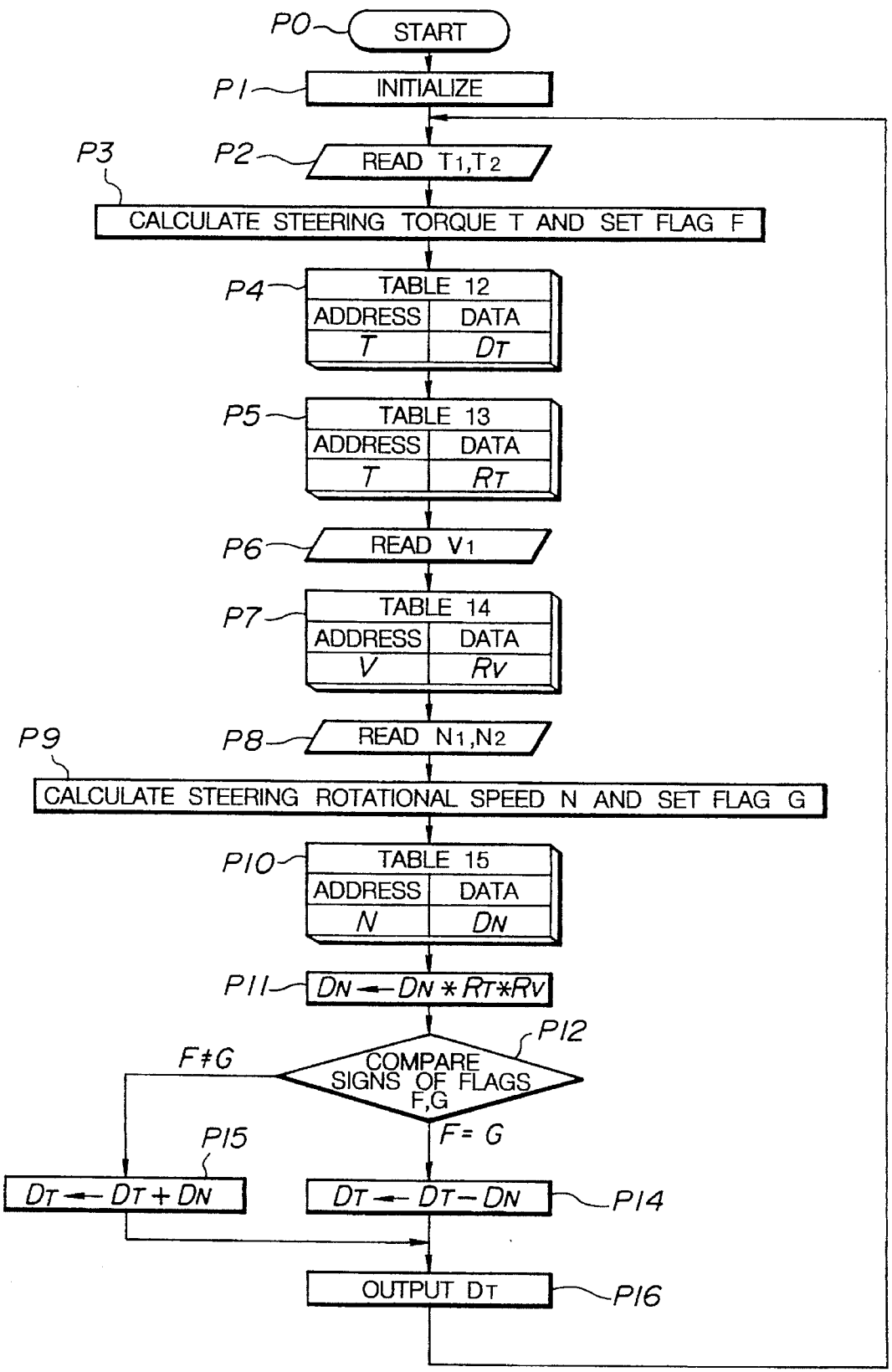
FIG. 31 is a flowchart of a second operation sequence of a control means in the electrically operated power steering apparatus shown in FIG. 26.

FIG. 31 shows a second operation sequence of the control means 130 in the electrically operated power steering apparatus shown in FIG. 26.

The second operation sequence shown in FIG. 31 differs from the first operation sequence shown in FIG. 30 in that the steps P13, P13' shown in FIG. 30 are dispensed with.

If the signs agree with each other (F=G) in the step P12, then the steering state detecting means 123 determines that the steering wheel 1 is in the returned state, and the motor control signal $D_T$ (Do=$D_T$−$D_N$) is outputted from the control signal output unit 121 in the steps P14, P16.

The sign of the motor control signal $D_T$ (Do=$D_T$−$D_N$) is determined by the output signal control means 131 shown in FIG. 27. If the motor control signal $D_T$ is positive, then it is outputted from the control signal output unit 121 with its sign remaining unchanged, and if the motor control signal $D_T$ is negative, then it is outputted from the control signal output unit 121 with its sign changed in the steps P14, P16, thereby controlling the motor driving means 116 to rotate the electric motor 110 in a direction opposite to the steering torque.

If the signs do not agree with each other (F≠G) in the step P12, then the motor control signal $D_T$ (Do=$D_T$+$D_N$) is outputted from the control signal output unit 121 in the steps P15, P16, as with the first operation sequence shown in FIG. 30.

If the motor control signal $D_T$ (Do=$D_T$−$D_N$) is smaller than a predetermined value Dk ($D_T$<Dk) in the returned state, the output signal control means 137 shown in FIG. 29 outputs the short-circuiting signal So3 for controlling a short circuit between the input terminals of the electric motor 110.

As described above, the electrically operated power steering apparatus according to the fifth and sixth embodiments have the steering torque detecting means, the steering rotational speed detecting means, and the control means. Based on a steering torque detected by the steering torque detecting means and a steering rotational speed detected by the steering rotational speed detecting means, the control means calculates a corrective value representing the product of a torque damping coefficient that decreases depending on the steering torque and a rotational speed control quantity corresponding to the steering rotational speed, and outputs a motor control signal produced by subtracting the corrective value from a torque control quantity corresponding to the steering torque when the steering wheel is in the turned state, and outputs a motor control signal produced by adding the corrective value to the torque control quantity when the steering wheel is in the returned state. Therefore, the electric motor can produce an assistive steering force, which decreases as the steering rotational speed increases and the steering torque decreases, in the same direction as the steering direction, when the steering system is in the turned state, and can produce an assistive steering force, which increases as the steering rotational speed increases and the steering torque decreases, in the opposite direction to the steering direction, when the steering system is in the returned state.

The electrically operated power steering apparatus according to the seventh embodiment has the steering torque detecting means, the steering rotational speed detecting means, the vehicle speed detecting means, and the control means. Based on a steering torque detected by the steering torque detecting means, a steering rotational speed detected by the steering rotational speed detecting means, and a vehicle speed detected by the vehicle speed detecting means, the control means calculates a corrective value representing the product of a torque damping coefficient that decreases depending on the steering torque, a rotational speed control quantity corresponding to the steering rotational speed, and a vehicle speed damping coefficient corresponding to the vehicle speed, and outputs a motor control signal produced by subtracting the corrective value from a torque control quantity corresponding to the steering torque when the steering wheel is in the turned state, and outputs a motor control signal produced by adding the corrective value to the torque control quantity when the steering wheel is in the returned state. Therefore, the electric motor can produce an assistive steering force, which decreases as the steering rotational speed and the vehicle speed increase and the steering torque decreases, in the same direction as the steering direction, when the steering system is in the turned state, and can produce an assistive steering force, which increases as the steering rotational speed and the vehicle speed increase and the steering torque decreases, in the opposite direction to the steering direction, when the steering system is in the returned state.

The electrically operated power steering apparatus according to the eighth embodiment has the control means which includes the output signal control means for determining a motor control signal produced by subtracting a corrective value from a torque control quantity when the steering wheel is in the turned state. Even when the motor control signal is of a negative value or is lower than a predetermined value, it is possible to output a motor control signal with an inverted sign, or a motor control signal of 0 level by inhibiting the correction process, or a motor control signal which establishes a short circuit between the input terminals of the electric motor.

Consequently, the electrically operated power steering apparatus can produce an optimum assistive steering torque when the motor vehicle is abruptly steered to avoid an object in emergency while quickly converging a vehicle behavior at the time the motor vehicle changes lanes when it runs at high speed.

Since the assistive steering force can be reduced in a small steering torque range, the stability of the steering system can be increased against disturbances such as a kickback.

Although there have been described what are at present considered to be the preferred embodiments of the invention, it will be understood that the invention may be embodied in other specific forms without departing from the essential characteristics thereof. The present embodiments are therefore to be considered in all respects as illustrative, and not restrictive. The scope of the invention is indicated by the appended claims rather than by the foregoing description.

What is claimed is:

1. An electrically operated power steering apparatus for applying power of an electric motor to a steering system to reduce manual steering forces in a motor vehicle, comprising:

steering torque detecting means for detecting a steering torque of the steering system;

steering rotational speed detecting means for detecting a steering rotational speed of the steering system;

steering state detecting means for detecting a turned state and a returned state of the steering system;

motor control signal determining means for determining a motor control signal which is produced by subtracting a value corresponding to an output signal from said steering rotational speed detecting means from a value corresponding to an output signal from said steering torque detecting means if said steering state detecting means detects the turned state of the steering system, and adding the value corresponding to the output signal from said steering rotational speed detecting means to the value corresponding to the output signal from said steering torque detecting means if said steering state detecting means detects the returned state of the steering system; and motor driving means for energizing the electric motor based on the motor control signal outputted from said motor control signal determining means.

2. An electrically operated power steering apparatus according to claim 1, wherein said steering rotational speed detecting means comprises motor status detecting means for detecting a motor voltage and a motor current of the electric motor, and steering rotational speed calculating means for calculating said steering rotational speed of the steering system based on an output signal from said motor status detecting means, whereby the steering rotational speed can be indirectly detected.

3. An electrically operated power steering apparatus for applying power of an electric motor to a steering system to reduce manual steering forces in a motor vehicle, comprising:

steering torque detecting means for detecting a steering torque of the steering system;

vehicle speed detecting means for detecting a vehicle speed of the motor vehicle;

steering state detecting means for detecting a turned state and a returned state of the steering system;

motor control signal determining means for determining a motor control signal which is produced by subtracting a value corresponding to an output signal from said vehicle speed detecting means from a value corresponding to an output signal from said steering torque detecting means if said steering state detecting means detects the turned state of the steering system, and adding the value corresponding to the output signal from said vehicle speed detecting means to the value corresponding to the output signal from said steering torque detecting means if said steering state detecting means detects the returned state of the steering system; and motor driving means for energizing the electric motor based on the motor control signal outputted from said motor control signal determining means.

4. An electrically operated power steering apparatus for applying power of an electric motor to a steering system to reduce manual steering forces in a motor vehicle, comprising:

steering torque detecting means for detecting a steering torque of the steering system;

steering rotational speed detecting means for detecting a steering rotational speed of the steering system;

vehicle speed detecting means for detecting a vehicle speed of the motor vehicle;

steering state detecting means for detecting a turned state and a returned state of the steering system;

motor control signal determining means for determining a motor control signal which is produced by subtracting a product of a value corresponding to an output signal from said steering rotational speed detecting means and a value corresponding to an output signal from said vehicle speed detecting means from a value corresponding to an output signal from said steering torque detecting means if said steering state detecting means detects the turned state of the steering system, and adding the product of the value corresponding to the output signal from said steering rotational speed detecting means and the value corresponding to the output signal from said vehicle speed detecting means to the value corresponding to the output signal from said steering torque detecting means if said steering state detecting means detects the returned state of the steering system; and motor driving means for energizing the electric motor based on the motor control signal outputted from said motor control signal determining means.

5. An electrically operated power steering apparatus according to claim 4, wherein said motor control signal determining means includes correction inhibiting means for inhibiting said product from being subtracted to and added if the output signal from said steering rotational speed detecting means is smaller than a predetermined value which decreases as the output signal from said vehicle speed detecting means increases.

6. An electrically operated power steering apparatus for applying power of an electric motor to a steering system to reduce manual steering forces in a motor vehicle, comprising:

steering torque detecting means for detecting a steering torque of the steering system;

steering rotational speed detecting means for detecting a steering rotational speed of the steering system;

steering state detecting means for detecting a turned state and a returned state of the steering system; and control means for determining a motor control signal to energize the electric motor, using a value detected by said steering state detecting means, based on the steering torque detected by said steering torque detecting means and the steering rotational speed detected by said steering rotational speed detecting means;

said control means comprising means for determining the motor control signal by calculating a corrective value by multiplying a value corresponding to the steering rotational speed by a coefficient which decreases depending on the steering torque, subtracting said corrective value from a value corresponding to the steering torque if said steering state detecting means detects the turned state of the steering system, and adding said corrective value to the value corresponding to the steering torque if said steering state detecting means detects the returned state of the steering system.

7. An electrically operated power steering apparatus for applying power of an electric motor to a steering system to reduce manual steering forces in a motor vehicle, comprising:

steering torque detecting means for detecting a steering torque of the steering system;

steering rotational speed detecting means for detecting a steering rotational speed of the steering system;

vehicle speed detecting means for detecting a vehicle speed of the motor vehicle;

steering state detecting means for detecting a turned state and a returned state of the steering system; and control means for determining a motor control signal to energize the electric motor, using a value detected by said steering state detecting means, based on the steering torque detected by said steering torque detecting means, the steering rotational speed detected by said steering rotational speed detecting means, and the vehicle speed detected by said vehicle speed detecting means;

said control means comprising means for determining the motor control signal by calculating a corrective value by multiplying a value corresponding to the steering rotational speed by a coefficient which decreases depending on the steering torque and a coefficient corresponding to the vehicle speed, subtracting said corrective value from a value corresponding to the steering torque if said steering state detecting means detects the turned state of the steering system, and adding said corrective value to the value corresponding to the steering torque if said steering state detecting means detects the returned state of the steering system.

8. An electrically operated power steering apparatus according to claim 6 or 7, wherein said control means has output signal control means, including a sign determining unit, for determining the motor control signal in a direction opposite to the steering torque through said sign determining unit if the motor control signal is determined as being of a negative value.

9. An electrically operated power steering apparatus according to claim 6 or 7, wherein said control means has output signal control means, including a correction inhibition control unit, for outputting the motor control signal while inhibiting a correction in said correction inhibition control unit if the motor control signal is determined as being of a negative value.

10. An electrically operated power steering apparatus according to claim 6 or 7, wherein said control means has output signal control means, including a short-circuiting signal output unit, for outputting the motor control signal to short-circuit terminals of the electric motor if the motor control signal is lower than a predetermined value.

* * * * *

UNITED STATES PATENT AND TRADEMARK OFFICE
CERTIFICATE OF CORRECTION

PATENT NO.:    5,596,252
DATED      :   January 21, 1997
INVENTOR(S):   Yasuo SHIMIZU et al.

It is certified that error appears in the above-identified patent and that said Letters Patent is hereby corrected as shown below:

```
On the title page,
```
Item [30], the last item under Foreign Application Priority Data should read as "6-258479".

Signed and Sealed this

Twenty-second Day of April, 1997

*Attest:*

BRUCE LEHMAN

*Commissioner of Patents and Trademarks*

*Attesting Officer*